US012755647B2

(12) United States Patent
Jones

(10) Patent No.: US 12,755,647 B2
(45) Date of Patent: Oct. 6, 2026

(54) METHODS, DEVICES, AND SYSTEMS FOR PROVIDING A CHARACTER MATRIX GAME

(71) Applicant: Nolan Jones, Greensboro, NC (US)

(72) Inventor: Nolan Jones, Greensboro, NC (US)

( * ) Notice: Subject to any disclaimer, the term of this patent is extended or adjusted under 35 U.S.C. 154(b) by 424 days.

(21) Appl. No.: 18/341,667

(22) Filed: Jun. 26, 2023

(65) Prior Publication Data

US 2024/0005816 A1 Jan. 4, 2024

Related U.S. Application Data

(60) Provisional application No. 63/356,522, filed on Jun. 29, 2022.

(51) Int. Cl.
*G09B 19/06* (2006.01)
*G09B 5/02* (2006.01)

(52) U.S. Cl.
CPC ............... *G09B 19/06* (2013.01); *G09B 5/02* (2013.01)

(58) Field of Classification Search
CPC .................................. G09B 5/02; G09B 19/06
See application file for complete search history.

(56) References Cited

U.S. PATENT DOCUMENTS 6,657,560 B1 * 12/2003 Jung .................. G06F 3/03543 400/486
8,459,885 B2 * 6/2013 Min ...................... G06F 3/0234 400/489
10,976,833 B2 4/2021 Jones
2010/0271241 A1 * 10/2010 Weller .................. G06F 3/0219 341/22
2012/0113007 A1 * 5/2012 Koch ...................... G06F 3/017 345/168
2013/0057475 A1 * 3/2013 Duggan .............. G06F 3/04886 345/168
2013/0067387 A1 * 3/2013 Kim ...................... G06F 3/0481 715/780
2019/0187891 A1 * 6/2019 Davis .................. G06F 3/04886
2019/0278382 A1 * 9/2019 Jones .................... G06F 3/0233
2022/0035439 A1 * 2/2022 Holland ................. G06V 20/20

FOREIGN PATENT DOCUMENTS

KR 102219280 B1 2/2021

* cited by examiner

*Primary Examiner* — Eddy Saint-Vil
(74) *Attorney, Agent, or Firm* — NK Patent Law

(57) ABSTRACT

A programmatic method for providing a matrix game using character labeled buttons of a language script system is disclosed. The programmatic method includes providing to a display a left side game section and a right side game section about a vertical central axis. The left-side game section includes a left-side cluster of character labeled-buttons formed from character labeled-buttons in multiple different left-side rows. The left-side character labeled-buttons generally depict an oval shape with character labeled-buttons forming the perimeter of the left-side cluster being disposed on a boundary of the oval shape in alphabetical order of the language script system. The right-side game section includes a right-side cluster of character labeled-buttons formed from character labeled-buttons in multiple different right-side rows. The right-side character labeled-buttons generally depict an oval shape with character labeled-buttons forming the perimeter of the right-side cluster being disposed on a boundary of the oval shape in alphabetical order of the language script system.

20 Claims, 17 Drawing Sheets

METHODS, DEVICES, AND SYSTEMS FOR PROVIDING A CHARACTER MATRIX GAME

PRIORITY CLAIM

This application claims priority to U.S. Provisional Patent Application Ser. No. 63/356,522 filed Jun. 29, 2022, entitled "Alphabet Matrix Game." The disclosure of the aforementioned application is incorporated herein by reference in its entirety.

TECHNICAL FIELD

The present application relates generally to a game, and relates more particularly to a game that challenges a person's visual, spacial memorization and kinesthetic abilities which re-enforce the learning of a language system's alphabet and/or glyph script.

BACKGROUND

Learning a foreign alphabet and/or foreign script can be extremely difficult. A few current methods include associating the characters with a known alphabet or script, associating one or more characters with a song, writing out the complete character set over and over, practicing a few characters over and over by hand, associating each character with a story, or a similar technique. These learning techniques are not well suited to all individuals.

As such new methods, systems, and devices for learning a foreign alphabet and/or a foreign script are needed.

SUMMARY

This disclosure presents methods, devices, and systems for providing a character matrix game. According to one embodiment, a programmatic method for providing a matrix game using character labeled buttons of a language script system is disclosed. The programmatic method includes providing to a display a left side game section and a right side game section about a central axis that the extends in a vertical direction. The left-side game section and the right-side game section are spaced apart.

The left-side game section located on the left side of the central axis includes a left-side cluster of character labeled-buttons formed from character labeled-buttons in multiple different left-side rows. The left-side rows include a left-side top row proximate to a top of the game and a left-side bottom row proximate to a bottom of the game that each has only a single labeled-character button to elongate the left-side cluster of character labeled-buttons in a vertical direction parallel to the central axis.

The left-side character labeled-buttons generally depict a perimeter of the left-side cluster as approximating an oval shape with character labeled-buttons forming the perimeter of the left-side cluster being disposed on a boundary of the oval shape in alphabetical order of the language script system.

The right-side game section located on the right of the central axis includes a right-side cluster of character labeled-buttons formed from character labeled-buttons in multiple different right-side rows. The right side rows include a right-side top row proximate to the top of the game and a right-side bottom row proximate to the bottom of the game that each has only a single character labeled-button to elongate the right-side cluster of character labeled-buttons in a vertical direction parallel to the central axis.

The right-side character labeled-buttons generally depict a perimeter of the right-side cluster as approximating an oval shape with character labeled-buttons forming the perimeter of the right-side cluster being disposed on a boundary of the oval shape in alphabetical order of the language script system.

The programmatic method further includes receiving user input and updating the display based on the user input.

In some embodiments, the user input may include a request to start the game and updating the display may include repositioning at least a portion of the character labeled-buttons of the left-side cluster of character labeled-buttons and right-side cluster of character labeled-buttons in a random manner.

In some embodiments, the programmatic method may further include providing a flip button within the game for switching the left-side cluster of character labeled-buttons with the right-side cluster of character labeled-buttons.

In some embodiments, the left-side cluster may include left-side inner alphabetically-ordered character labeled-buttons that are character labeled-buttons in an inner part of the left-side cluster and that are arranged in a line in alphabetical order according to an alphabet. The right-side cluster may include right-side inner alphabetically-ordered character labeled-buttons that are character labeled-buttons in an inner part of the right-side cluster and that are arranged in a line in alphabetical order according to said alphabet.

In further embodiments, the character labeled-buttons forming the perimeter of the left-side cluster may each be ordered in the alphabet before any of the left-side inner alphabetically-ordered character buttons. Additionally, the left-side inner alphabetically-ordered character labeled-buttons may each be ordered in the alphabet before any of the character labeled-buttons forming the perimeter of the right-side cluster and the character labeled-buttons forming the perimeter of the right-side cluster may each be ordered in the alphabet before any of the right-side inner alphabetically-ordered character labeled-buttons.

In other embodiments, the character labeled-buttons forming the perimeter of the right-side cluster may each be ordered in the alphabet before any of the right-side inner alphabetically-ordered character labeled-buttons. Additionally, the right-side inner alphabetically-ordered character labeled-buttons may each be ordered in the alphabet before any of the character labeled-buttons forming the perimeter of the left-side cluster and the character labeled-buttons forming the perimeter of the left-side cluster may each be ordered in the alphabet before any of the left-side inner alphabetically-ordered character labeled-buttons.

In some embodiments, the left-side rows may further include a widest left-side row that is between the left-side top row and the left-side bottom row, that has two or more character labeled-buttons, and that is the widest among the left-side rows in terms of a distance spanned by character labeled-buttons in the left-side row or in terms of inter-character spacing; an upper intermediate left-side row that is between the widest left-side row and the left-side top row, that has two or more character labeled-buttons, and that is narrower than the widest left-side row in terms of a distance spanned by character labeled-buttons in the left-side row or in terms of inter-character spacing; and a lower intermediate left-side row that is between the widest left-side row and the left-side bottom row, that has two or more character labeled-buttons, and that is narrower than the widest left-side row in terms of a distance spanned by character labeled-buttons in the left-side row or in terms of inter-character spacing.

In further embodiments, the right-side rows may further include a widest right-side row that is between the right-side top row and the right-side bottom row, that has two or more letter labeled-buttons, and that is the widest among the right-side rows in terms of a distance spanned by character labeled-buttons in the right-side row or in terms of inter-character spacing; an upper intermediate buttons-side row that is between the widest right-side row and the right-side top row, that has two or more character labeled-buttons, and that is narrower than the widest right-side row in terms of a distance spanned by character labeled-buttons in the right-side row or in terms of inter-character spacing; and a lower intermediate right-side row that is between the widest right-side row and the right-side bottom row, that has two or more character labeled-buttons, and that is narrower than the widest right-side row in terms of a distance spanned by character buttons in the right-side row or in terms of inter-character spacing.

In still further embodiments, the left-side rows may further include a further lower intermediate left-side row that is between the lower intermediate left-side row and the left-side bottom row, that has two or more character labeled-buttons, and that is narrower than the lower intermediate left-side row in terms of a distance spanned by character labeled-buttons in the left-side row or in terms of inter-character spacing; and the right-side rows may further include a further lower intermediate right-side row that is between the lower intermediate right-side row and the right-side bottom row, that has two or more character labeled-buttons, and that is narrower than the lower intermediate right-side row in terms of a distance spanned by character labeled-buttons in the right-side row or in terms of inter-character spacing.

In some embodiments, the single character labeled-button in each of the left-side top row and the left-side bottom row may be centered on a left-side axis extending between the left-side top row and the left-side bottom row, and the single labeled-character button in each of the right-side top row and the right-side bottom row may be centered on a right-side axis extending between the right-side top row and the right-side bottom row.

In further embodiments, each left-side intermediate row between the left-side top row and the left-side bottom row may include at least an outermost left-side character labeled-button and an outermost right-side character labeled-button. The outermost labeled-left-side character button may be offset the farthest left from the left-side axis among all character labeled-button in the left-side intermediate row. The outermost right-side character labeled-button may be offset the farthest right from the left-side axis among all character labeled-buttons in the left-side intermediate row.

In still further embodiments, the perimeter of the left-side cluster may be formed from the single character labeled-button in the left-side top row, the single character labeled-buttons in the left-side bottom row, the outermost left-side character labeled-button, and the outermost right-side character button in each left-side intermediate row.

In still further embodiments, each right-side intermediate row between the right-side top row and the right-side bottom row may include at least an outermost left-side character labeled-button and an outermost right-side character labeled-button. The outermost left-side character labeled-button may be offset the farthest left from the right-side axis among all character labeled-buttons in the right-side intermediate row. The outermost right-side character labeled-buttons may be offset the farthest right from the right-side axis among all character labeled-buttons in the right-side intermediate row.

In still further embodiments, the perimeter of the right-side cluster may be formed from the single labeled-character button in the right-side top row, the single character button in the right-side bottom row, the outermost left-side character labeled-button, and the outermost right-side character labeled-button in each right-side intermediate row.

In some embodiments, the left-side rows may include the left-side top row, the left-side bottom row, and four left-side intermediate rows between the left-side top row and the left-side bottom row. At least three of the four left-side intermediate rows may include three or more character labeled-buttons. The right-side rows may include the right-side top row, the right-side bottom row, and four right-side intermediate rows between the right-side top row and the right-side bottom row. At least three of the four right-side intermediate rows comprise three or more character labeled-buttons.

In some embodiments, the single character labeled-buttons in the left-side top row, the left-side bottom row, the right-side top row, and the right-side bottom row may have a common visual characteristic that visually distinguishes the single character labeled-buttons from character labeled-buttons in an inner part of the left-side cluster and from character labeled-buttons in an inner part of the right-side cluster. At least some of the character labeled-buttons forming the perimeter of the left-side cluster also may have the common visual characteristic. At least some of the character labeled-buttons forming the perimeter of the right-side cluster may also have the common visual characteristic.

In some embodiments, the single character labeled-button in the left-side top row may be an ‘a’ letter. The left-side rows may further include a second left-side row of character labeled-buttons that is below the left-side top row and that, from left to right, comprises a ‘j’ letter, a ‘k’ letter, and a ‘b’ letter; a third left-side row of character labeled-buttons that is below the second left-side row and that, from left to right, comprises an T letter, an ‘1’ letter, and a ‘c’ letter; a fourth left-side row of character labeled-buttons that is below the third left-side row and that, from left to right, comprises an ‘h’ letter, an ‘m’ letter, and a ‘d’ letter; and a fifth left-side row of character labeled-buttons that is below the fourth left-side row, that is above the left-side bottom row, and that, from left to right, comprises a ‘g’ letter and an ‘e’ letter. The single character labeled-button in the left-side bottom row may be an ‘f’ letter;

In further embodiments, the single character labeled-button in the right-side top row may be an ‘n’ letter. The right-side rows may further include a second right-side row of character labeled-buttons that is below the right-side top row and that, from left to right, includes a ‘w’ letter, an ‘x’ letter, and an ‘o’ letter; a third right-side row of character labeled-buttons that is below the second right-side row and that, from left to right, comprises a ‘V’ letter, a ‘y’ letter, and a ‘ID’ letter; a fourth right-side row of character labeled-buttons that is below the third right-side row and that, from left to right, includes a ‘u’ letter, a ‘z’ letter, and a ‘q’ letter; and a fifth right-side row of character labeled-buttons that is below the fourth right-side row, that is above the right-side bottom row, and that, from left to right, that includes a ‘t’ letter and an ‘r’ letter; and the single character labeled-button in the right-side bottom row is an ‘s’ letter.

In some embodiments, the programmatic method may be implemented by an application specific program. In further embodiments, the application specific program may be an iOS® app, an Android® OS app, a watchOS® app, an iPad OS® app, a visionOS® app, a Mac OS app, a Windows OS app, a ChromeOS app, a Linux OS app, and/or the like.

In some embodiments, the programmatic method may be provided to a user via a web browser. In further embodiments, the web browser may be a Microsoft Internet Explorer® browser, a Microsoft Edge® browser, an Apple Safari® browser, a Google Chrome® browser, a Mozilla Firefox® browser, an Opera® browser, an Epic® privacy browser, and/or the like.

In some embodiments, the programmatic method may be provided to a user via a smart phone, a smart tablet, a laptop, a personal computer (PC), a workstation, a smart television (TV), a smart watch, a smart ring, a virtual reality (VR) device, an augmented reality (AR) device, and/or the like.

In some embodiments, at least a portion of the user input may be received from a physical movement of the user, a plurality of brainwaves of the user, a plurality of eye movements of the user, speech provided by the user, and/or the like.

In some embodiments, at least a portion of the programmatic method is implemented within hardware specific circuitry. In further embodiments, the hardware specific circuitry may include an application specific integrated circuit (ASIC), a field programmable gate array (FPGA), and/or the like.

According to another embodiment, a computing device for providing a matrix game using character labeled buttons of a language script system is disclosed. The computer device includes a memory and at least one processor configured for providing to a display a left side game section and a right side game section about a central axis that the extends in a vertical direction. The left-side game section and the right-side game section are spaced apart.

The left-side game section located on the left side of the central axis includes a left-side cluster of character labeled-buttons formed from character labeled-buttons in multiple different left-side rows. The left-side rows include a left-side top row proximate to a top of the game and a left-side bottom row proximate to a bottom of the game that each has only a single labeled-character button to elongate the left-side cluster of character labeled-buttons in a vertical direction parallel to the central axis.

The left-side character labeled-buttons generally depict a perimeter of the left-side cluster as approximating an oval shape with character labeled-buttons forming the perimeter of the left-side cluster being disposed on a boundary of the oval shape in alphabetical order of the language script system.

The right-side game section located on the right of the central axis includes a right-side cluster of character labeled-buttons formed from character labeled-buttons in multiple different right-side rows. The right side rows include a right-side top row proximate to the top of the game and a right-side bottom row proximate to the bottom of the game that each has only a single character labeled-button to elongate the right-side cluster of character labeled-buttons in a vertical direction parallel to the central axis.

The right-side character labeled-buttons generally depict a perimeter of the right-side cluster as approximating an oval shape with character labeled-buttons forming the perimeter of the right-side cluster being disposed on a boundary of the oval shape in alphabetical order of the language script system.

The at least one processor is further configured for receiving user input and updating the display based on the user input.

Additionally, the at least one processor may be further configured to provide to the display any of the previously described embodiments of the programmatic method.

According to another embodiment, anon-transitory computer readable medium includes a plurality of machine-readable instructions which when executed by one or more processors are adapted to perform a method for providing a game using character labeled buttons of a language script system. The method includes providing to a display a left side game section and a right side game section about a central axis that the extends in a vertical direction. The left-side game section and the right-side game section are spaced apart.

The left-side game section located on the left side of the central axis includes a left-side cluster of character labeled-buttons formed from character labeled-buttons in multiple different left-side rows. The left-side rows include a left-side top row proximate to a top of the game and a left-side bottom row proximate to a bottom of the game that each has only a single labeled-character button to elongate the left-side cluster of character labeled-buttons in a vertical direction parallel to the central axis.

The left-side character labeled-buttons generally depict a perimeter of the left-side cluster as approximating an oval shape with character labeled-buttons forming the perimeter of the left-side cluster being disposed on a boundary of the oval shape in alphabetical order of the language script system.

The right-side game section located on the right of the central axis includes a right-side cluster of character labeled-buttons formed from character labeled-buttons in multiple different right-side rows. The right side rows include a right-side top row proximate to the top of the game and a right-side bottom row proximate to the bottom of the game that each has only a single character labeled-button to elongate the right-side cluster of character labeled-buttons in a vertical direction parallel to the central axis.

The right-side character labeled-buttons generally depict a perimeter of the right-side cluster as approximating an oval shape with character labeled-buttons forming the perimeter of the right-side cluster being disposed on a boundary of the oval shape in alphabetical order of the language script system.

The programmatic method further includes receiving user input and updating the display based on the user input.

Additionally, the method may include any of the previously described embodiments of the programmatic method.

The features and advantages described in this summary and the following detailed description are not all-inclusive. Many additional features and advantages will be apparent to one of ordinary skill in the art in view of the drawings, specification, and claims presented herein.

DETAILED DESCRIPTION

Figure 1A:
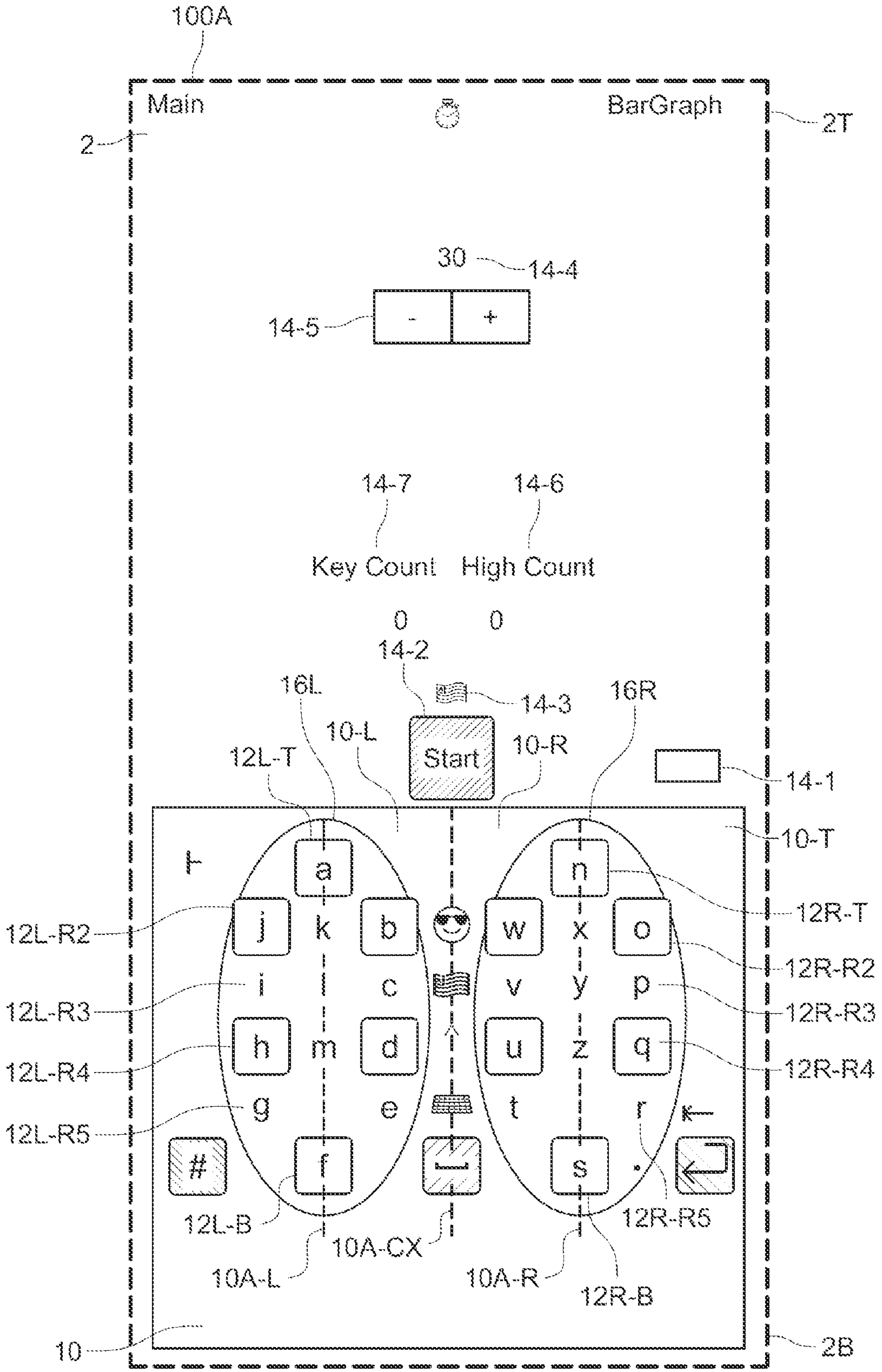
FIG. 1A depicts a diagram illustrating a detailed labeling of an initial positional state of English language character labeled-buttons in left-side and right-side clusters in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description.

Reference in this specification to “one embodiment” or “an embodiment” means that a particular feature, structure, or characteristic described in connection with the embodiment is included in at least one embodiment of the disclosure. The appearances of the phrase “in one embodiment” in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Unless otherwise indicated, all numbers expressing quantities of components, conditions, and so forth used in the specification and claims are to be understood as being modified in all instances by the term “about”. Accordingly, unless indicated to the contrary, the numerical parameters set forth in the instant specification and attached claims are approximations that can vary depending upon the desired properties sought to be obtained by the presently disclosed subject matter.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Normal teaching of a language system’s alphabet or glyph script as discussed in the background section, traditionally uses a linear layout of the letters in a defined order; thus not taking into account of other spacial layouts that can be used to learn a language system’s alphabet, such as a geometric oval/ellipse.

This disclosure presents methods, devices, and systems for providing a character matrix game that takes into account such spacial layouts (including a geometric oval/ellipse) in learning a language system’s alphabet.

In general, a character matrix game is configured for laying-out an alphabet script into a computing device. The character matrix game has a left-side section and a right-side section. The left-side game section comprises a left-side cluster of letter labeled-buttons formed from letter labeled-buttons in multiple different left-side rows, including a left-side top row and a left-side bottom row that each has only a single letter labeled-button. Letter labeled-buttons forming a perimeter of the left-side cluster are arranged around the perimeter in alphabetical order according to said alphabet. Similarly, the right-side game section comprises a right-side cluster of letter labeled-buttons formed from letter labeled-buttons in multiple different right-side rows, including a right-side top row and a right-side bottom row that each has only a single letter labeled-button. Letter labeled-buttons forming a perimeter of the right-side cluster are arranged around the perimeter in alphabetical order according to said alphabet.

In some embodiments, inclusion of only a single character labeled-button in the top and/or bottom. Advantageously arranging the character labeled-buttons according to a standardized order of the language script system, e.g., so as to parallel a child's cognitive learning of that standardized order, may advantageously help expedite the process of learning how to read and to type on a non-QWERTY keyboard. Alternatively or additionally, some embodiments differentiate the character labeled-buttons of different rows in terms of inter-letter spacing or the distance spanned by the character labeled-buttons in order to advantageously cause the characters of the character labeled-buttons on a cluster's perimeter to be arranged in an approximately oval shape. Approximating such a basic shape on the game that anyone can visually identify even at an early stage of mental cognitive development may help expedite learning how to read and to type on a non-QWERTY keyboard.

Other embodiments herein include a game that is configured for laying-out an alphabet script into a computing device. The game has a left-side game section and a right-side game section. The left-side game section comprises multiple different left-side rows. The left-side rows include: a left-side top row that has only a single character labeled-button; a left-side bottom row that has only a single character labeled-button, wherein the single character labeled-button in each of the left-side top row and the left-side bottom row is centered on a left-side axis extending between the left-side top row and the left-side bottom row; and three or more left-side intermediate rows between the left-side top row and the left-side bottom row, wherein each left-side intermediate row has at least a left-side character labeled-button whose center is offset to the left of the left-side axis and a right-side character labeled-button whose center is offset to the right of the left-side axis. The right-side game section comprises multiple different right-side rows. The right-side rows include: a right-side top row that has only a single character labeled-button; a right-side bottom row that has only a single character labeled-button, wherein the single letter labeled-button in each of the right-side top row and the right-side bottom row is centered on a right-side axis extending between the right-side top row and the right-side bottom row; and three or more right-side intermediate rows between the right-side top row and the right-side bottom row, wherein each right-side intermediate row has at least a left-side character button whose center is offset to the left of the right-side axis and a right-side character labeled-button whose center is offset to the right of the right-side axis.

Still other embodiments herein include the character matrix game as described in any of the above embodiments, in physical and/or virtual form.

In a preferred embodiment, FIG. 1A depicts a diagram 100A illustrating a detailed labeling of an initial positional state of English language character labeled-buttons in left-side and right-side clusters of a character matrix game 10 in accordance with embodiments of the present disclosure. The character matrix game 10 may serve as part of a user interface for moving character buttons of a game system into a computing device 2. In some embodiments, such as the one illustrated in FIG. 1A, the computing device may be a mobile device such as a smartphone.

The character matrix game 10 is functionally or logically split, relative to a central axis 10A-CX, into a left-side game section 10L on the left of the central axis 10A-CX and a right-side game section 10R on the right of the central axis 10A-CX. The left-side game section includes multiple different rows of character labeled-buttons, referred to as left-side rows. The left-side rows in this regard are formed from character labeled-buttons to the left of the central axis 10A-CX. The left-side rows include a left-side top row 12L-T proximate to a top of the character matrix game 10 and a left-side bottom row 12L-B proximate to bottom of character matrix game. The top 10T of the character matrix game 10 may be the side of the character matrix game 10 closest to a top 2T of the computing device 2, whereas the bottom of the game may be the side of the character matrix game 10 closest to a bottom 2B of the computing device 2, e.g., at least for portrait orientation of the character matrix game 10. Regardless, the left-side rows may also include one or more left-side intermediate rows 12L-R2, 12L-R3, 12L-R4, 12L-R5 are between the left-side top row 12L-T and the left-side bottom row 12L-B.

Similarly, the right-side game section 10R includes multiple different rows of character labeled-buttons, referred to as right-side rows. The right-side rows in this regard are formed from character labeled-buttons to the right of the central axis 10A-CX. The right-side rows include a right-side top row 12R-T proximate to a top 10T of the character matrix game 10 and a right-side bottom row 12R-B proximate to bottom of game. The top 10T of the character matrix game 10 may be the side of the character matrix game 10 closest to a top 2T of the computing device 2, whereas the bottom of the character matrix game may be the side of the character matrix game 10 closest to a bottom 2B of the computing device 2, e.g., at least for portrait orientation of the character matrix game 10.

Regardless, the right-side rows may also include one or more right-side intermediate rows 12R-R2, 12R-R3, 12R-R4, 12R-R5 are between the right-side top row 12R-T and the right-side bottom row 12R-B.

In fact, in some embodiment as shown, the left-side game section 10L and the right-side game section 10R are symmetrical in terms of the way the character labeled-buttons in those sections 10L, 10R are arranged (e.g., with the same number of rows of character labeled-buttons, with the same number of character labeled-buttons in each respective row, and the like).

FIG. 1A further shows that, in one or more embodiments, the left-side top row 12L-T and the right-side top row 12R-T each have only a single character labeled-button. That is, the left-side top row 12L-T and the right-side top row 12R-T each has only one character labeled-button in the row, with zero or more other types of character labeled-button (e.g., functional character labeled-buttons) possibly in the row as well. Alternatively or additionally, the left-side bottom row 12L-B and the right-side bottom row 12R-B each have only a single character labeled-button, with zero or more other types of character labeled-button (e.g., functional character labeled-buttons) possibly in the row as well. In some embodiments, as shown in FIG. 1A, the single character labeled-button in the left-side top row 12L-T and/or the single character labeled-button in the left-side bottom row 12L-B is centered on a left-side axis 10A-L extending between the left-side top row 12L-T and the left-side bottom row 12L-B. Alternatively or additionally, the single character labeled-button in the right-side top row 12R-T and/or the single character labeled-button in the right-side bottom row 12R-B is centered on a right-side axis 10A-R extending between the right-side top row 12R-T and the right-side bottom row 12R-B. Regardless, in some embodiments, such a single character labeled-button in a row may be referred to as an anchor point. In any event, inclusion of only a single character labeled-button in these top and/or bottom rows may effectively elongate the character labeled-button footprint in a vertical direction parallel to the central axis 10A-CX so as to advantageously mimic thumbprints of thumbs with which the character matrix game 10 is usable.

FIG. 1A similarly shows that no matter the particular number of intermediate rows or the number of character labeled-buttons in each intermediate row, the character labeled-buttons in some embodiments may form one or more clusters of character labeled-buttons on the character matrix game 10. As shown, for instance, the character labeled-buttons in the left-side rows form a left-side cluster 16-L and/or the character labeled-buttons in the right-side rows form a right-side cluster 16-R that is distinguishable from the left-side cluster 16-L. The left-side cluster 16-L and the right-side cluster 16-R may be non-overlapping with one another and/or be separated from one another by one or more non-letter labeled-buttons, e.g., functional labeled-buttons as seen vertically in-line with 10A-CX. The character labeled-buttons in any given cluster 16-L or 16-R may be clustered in the sense that the character labeled-buttons are spatially grouped together in a contiguous manner, without any other types of character labeled-buttons interspersed there between. As shown in FIG. 1, though, character labeled-buttons in a cluster may still be considered clustered even if some of the character labeled-buttons are separated by a non-letter portion of the game (e.g., the bottom intermediate row in FIG. 1 has a "blank" space rather than a center character labeled-button).

FIG. 1A a cluster of character labeled-buttons (e.g., cluster 16-L or 16-R) is bounded by a perimeter. In this case, some character labeled-buttons (e.g., those on the outermost parts of the cluster) may effectively form the perimeter of the cluster, whereas other character labeled-buttons may be in an inner part of the cluster so as to be surrounded by one or more other character labeled-buttons in the cluster. As shown in FIG. 1, the perimeter of the left-side cluster 16-L is formed by the single character labeled-button in the left-side top row 12L-T, the single character labeled-button in the left-side bottom row 12L-B, and the character labeled-buttons on each end of the left-side intermediate rows 12L-(R2, R3, R4, R5). FIG. 1A generally depicts the perimeter of the left-side cluster 16-L as approximating the shape of an oval (e.g., with character labeled-buttons forming the cluster's perimeter being disposed on the boundary of that shape).

FIG. 1A also shows that the perimeter of the right-side cluster 16-R is formed by the single character labeled-button in the right-side top row 12R-T, the single character labeled-button in the right-side bottom row 12R-B, and the character labeled-buttons on each end of the right-side intermediate rows 12R-(R2, R3, R4, R5). FIG. 1A generally depicts the perimeter of the right-side cluster 16-R as approximating the shape of an oval (e.g., with character labeled-buttons forming the cluster's perimeter being disposed on the boundary of that shape).

Notably, the character labeled-buttons forming the perimeter of a cluster are arranged around the perimeter in a standardized order of the language script system. The standardized order may be standardized in the sense that it is recognized by a governing or standard-setting body as being the order in which character labeled-buttons of the language script system are ordered, e.g., for collation or learning purposes. Arranging the character labeled-buttons in this way according to such a standardized order (e.g., so as to parallel a child's cognitive learning of that standardized order, may advantageously help expedite the process of learning how to read and type on a non-QWERTY keyboard.)

FIG. 1A shows a flip button 14-1 that switches 16L cluster of character labeled-buttons to right side 10-R of character matrix game 10 and at the same instance, switches 16R cluster of character labeled-buttons to left side 10-L of character matrix game 10.

FIG. 1A shows a start-timer button 14-2 that starts a count-down timer, activates the method to randomly rearrange the buttons and reset the formation of the buttons into the starting formation of the character buttons. In other embodiments, one or more machine learning techniques may be used to rearrange the character buttons in a non-random manner that further enhances a user's learning experience based on previous sessions of game play associated with the game.

FIG. 1A shows a language script selection button 14-3 for selecting character types (e.g., English, Korean, etc.).

FIG. 1A shows a digital timer display 14-4.

FIG. 1A shows an additional functional button 14-5 for set starting time of digital timer.

FIG. 1A shows an additional functional display 14-6 indicating the highest number count of buttons moved for current game sessions.

FIG. 1A shows an additional functional display 14-7 indicating the number count of buttons moved for current game session.

Figure 1B:
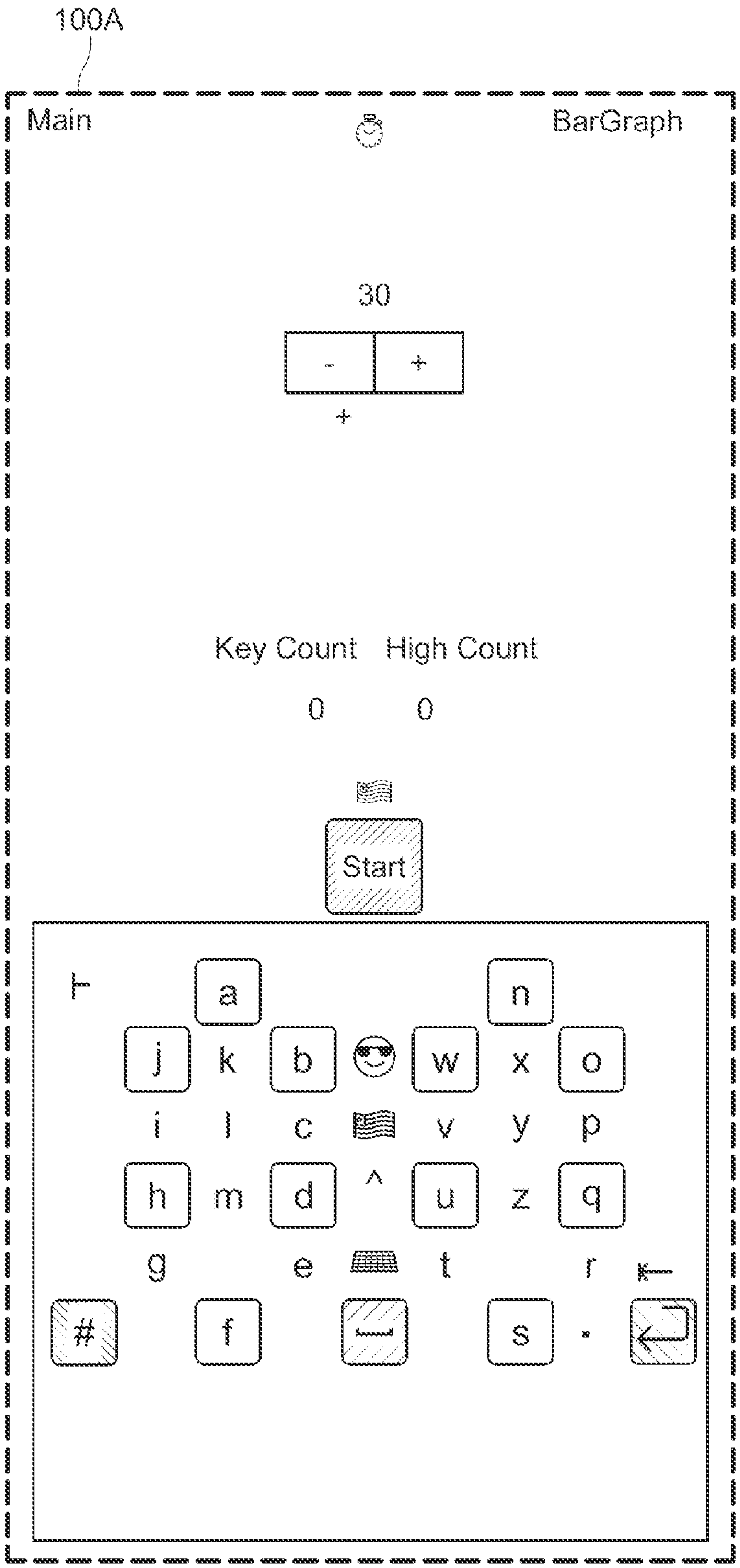
FIG. 1B depicts the diagram of FIG. 1A without the labeling for additional clarity in accordance with embodiments of the present disclosure.

FIG. 1B depicts the diagram 100A of FIG. 1A without the labeling for additional clarity in accordance with embodiments of the present disclosure.

Figure 1C:
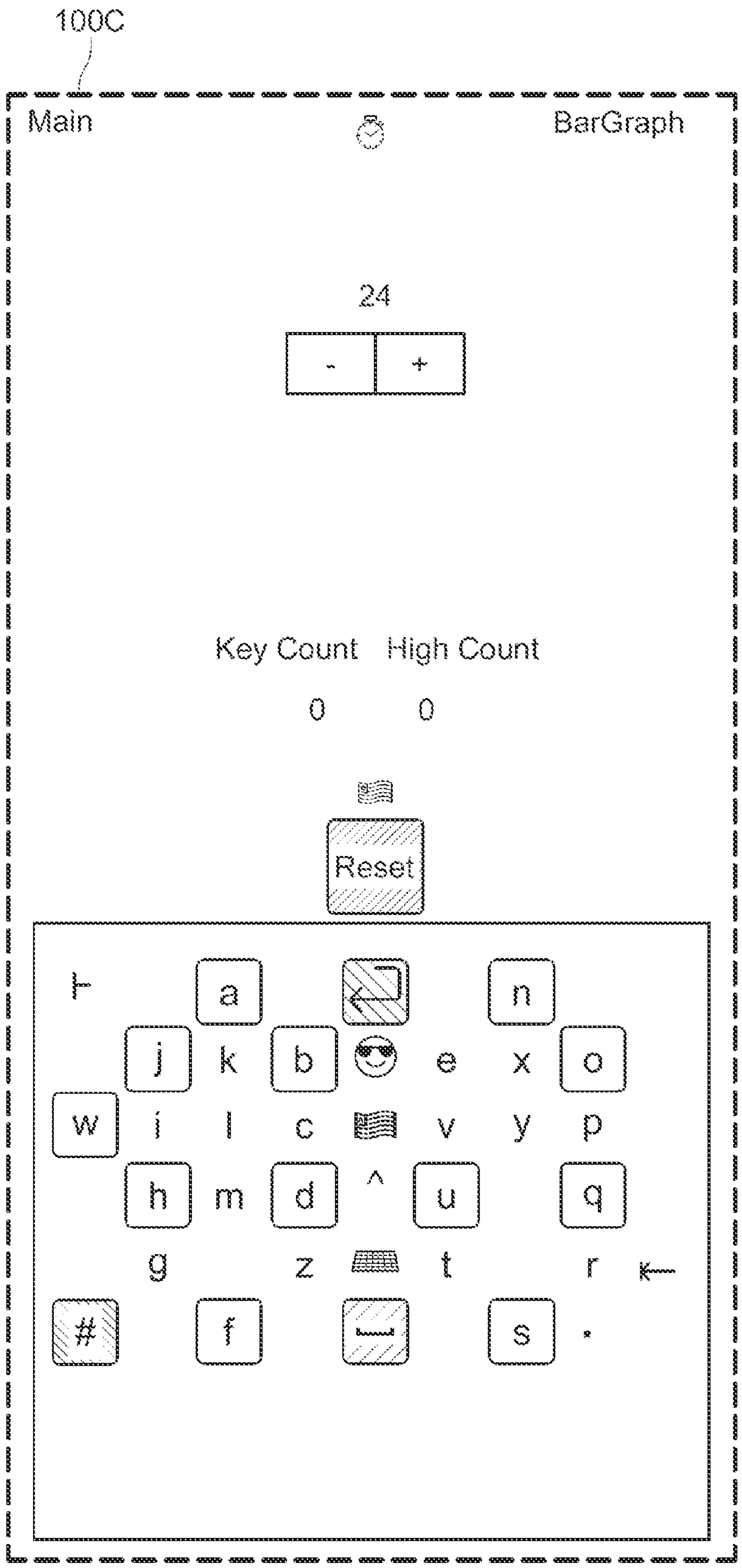
FIG. 1C depicts a diagram illustrating a random positional state of English language character labeled-buttons in left-side and right-side clusters in accordance with embodiments of the present disclosure.

FIG. 1C depicts a diagram 100C illustrating a random positional state of English language character labeled-buttons in left-side and right-side clusters in accordance with embodiments of the present disclosure.

Figure 2A:
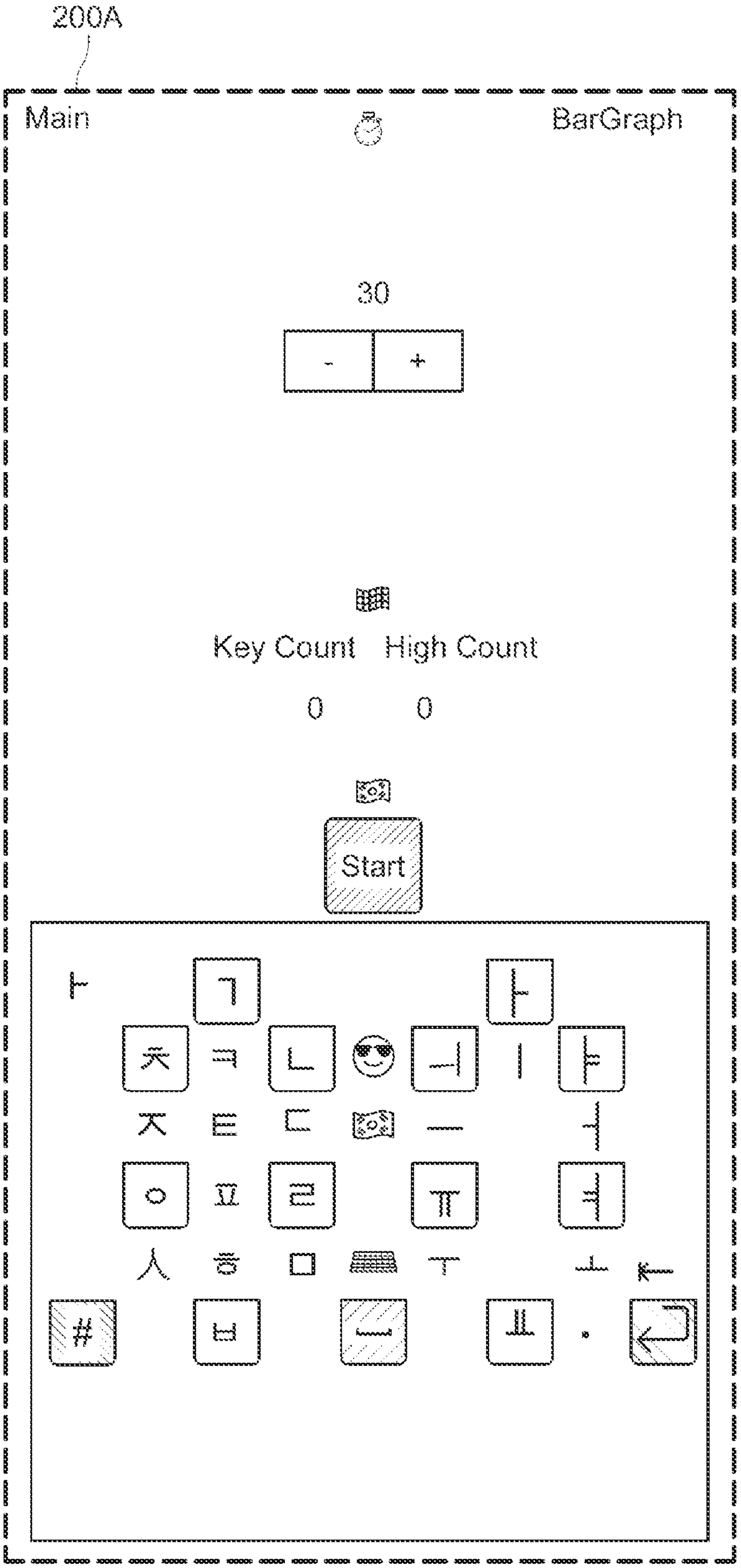
FIG. 2A depicts a diagram illustrating an initial positional state of Korean language character labeled-buttons in left-side and right-side clusters in accordance with embodiments of the present disclosure.

FIG. 2A depicts a diagram 200A illustrating an initial positional state of Korean language character labeled-buttons in left-side and right-side clusters in accordance with embodiments of the present disclosure.

Figure 2B:
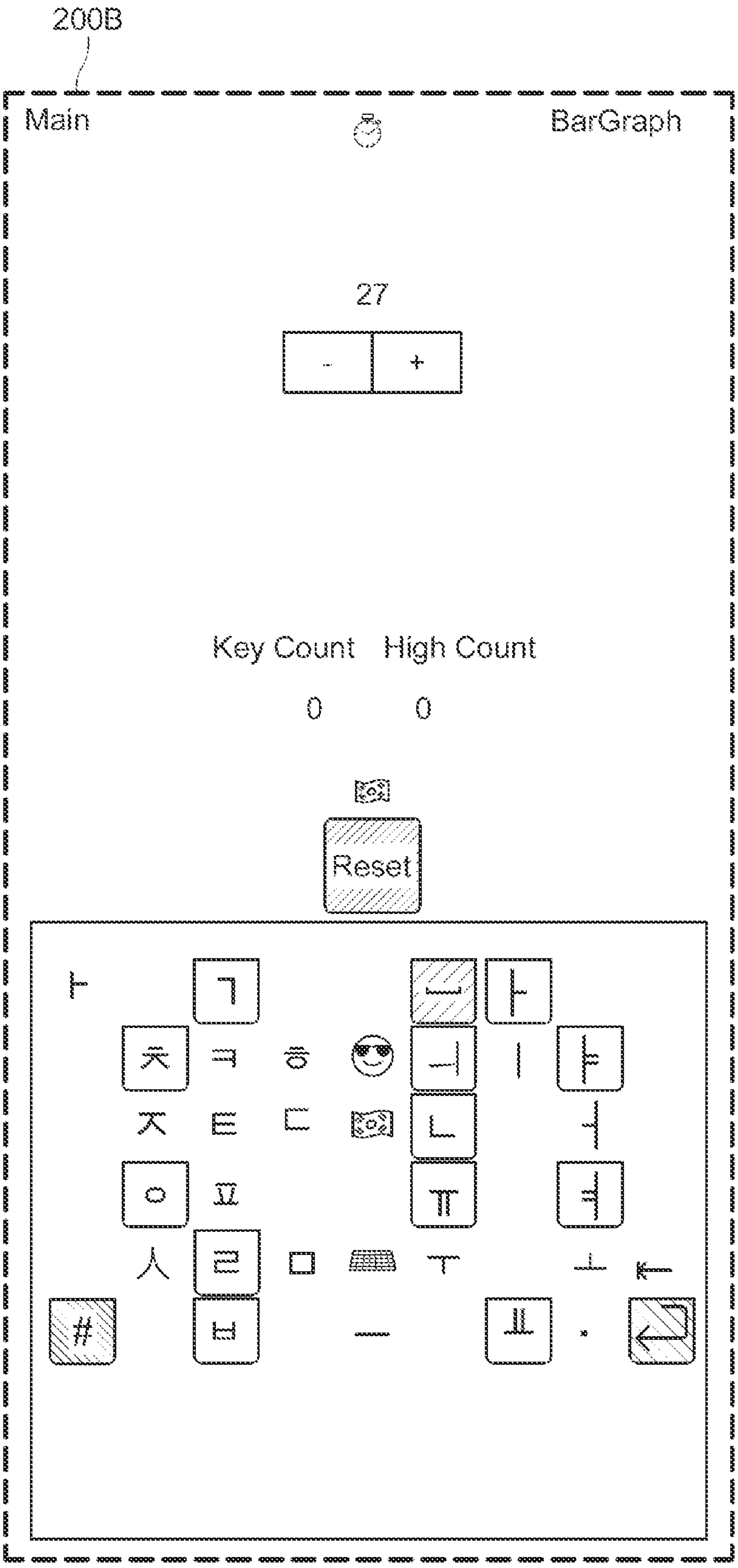
FIG. 2B depicts a diagram illustrating a random positional state of Korean language character labeled-buttons in left-side and right-side clusters in accordance with embodiments of the present disclosure.

FIG. 2B depicts a diagram 200B illustrating a random positional state of Korean language character labeled-buttons in left-side and right-side clusters in accordance with embodiments of the present disclosure.

Figure 3A:
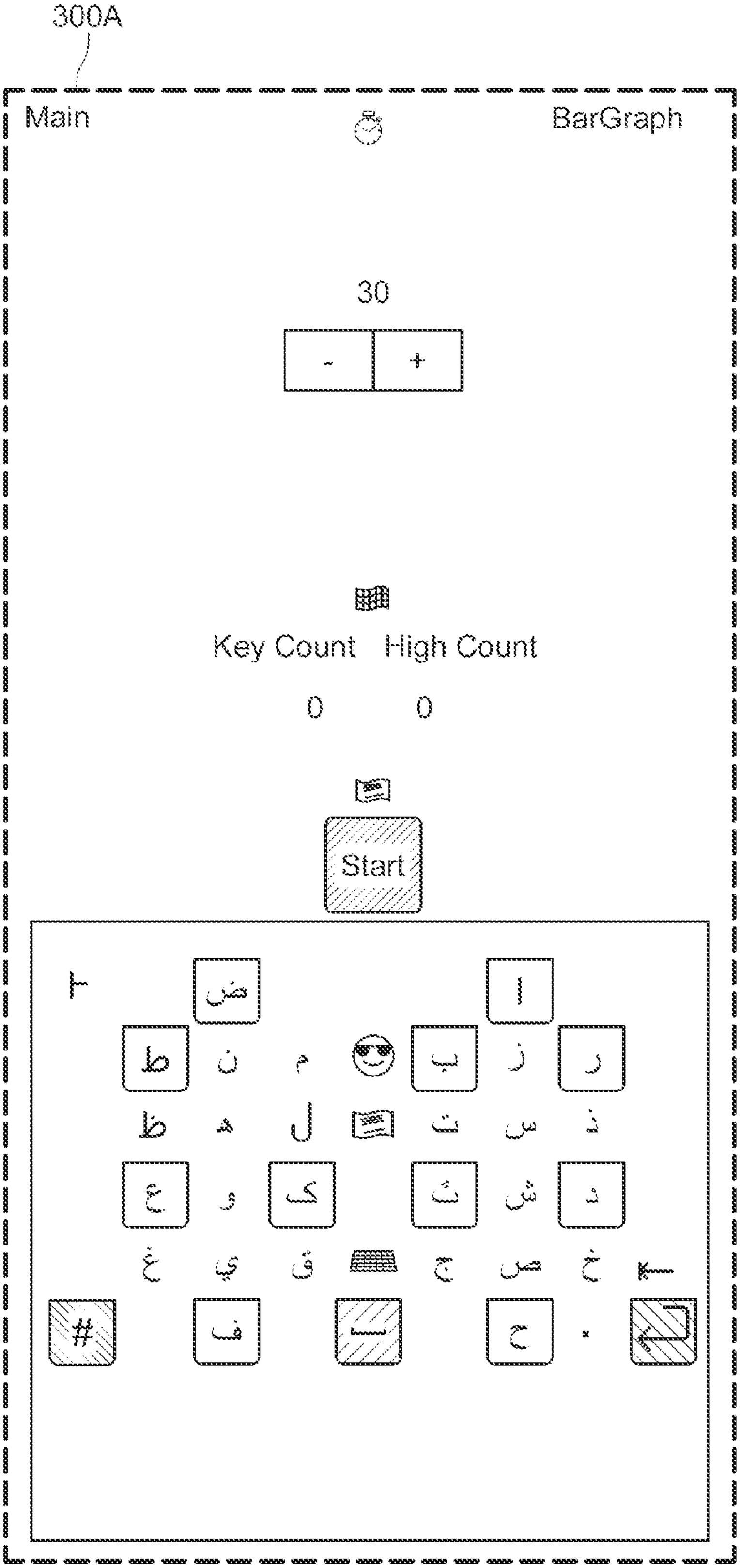
FIG. 3A depicts a diagram illustrating an initial positional state of Arabic language character labeled-buttons in left-side and right-side clusters embodiment in accordance with embodiments of the present disclosure.

FIG. 3A depicts a diagram 300A illustrating an initial positional state of Arabic language character labeled-buttons in left-side and right-side clusters embodiment in accordance with embodiments of the present disclosure.

Figure 3B:
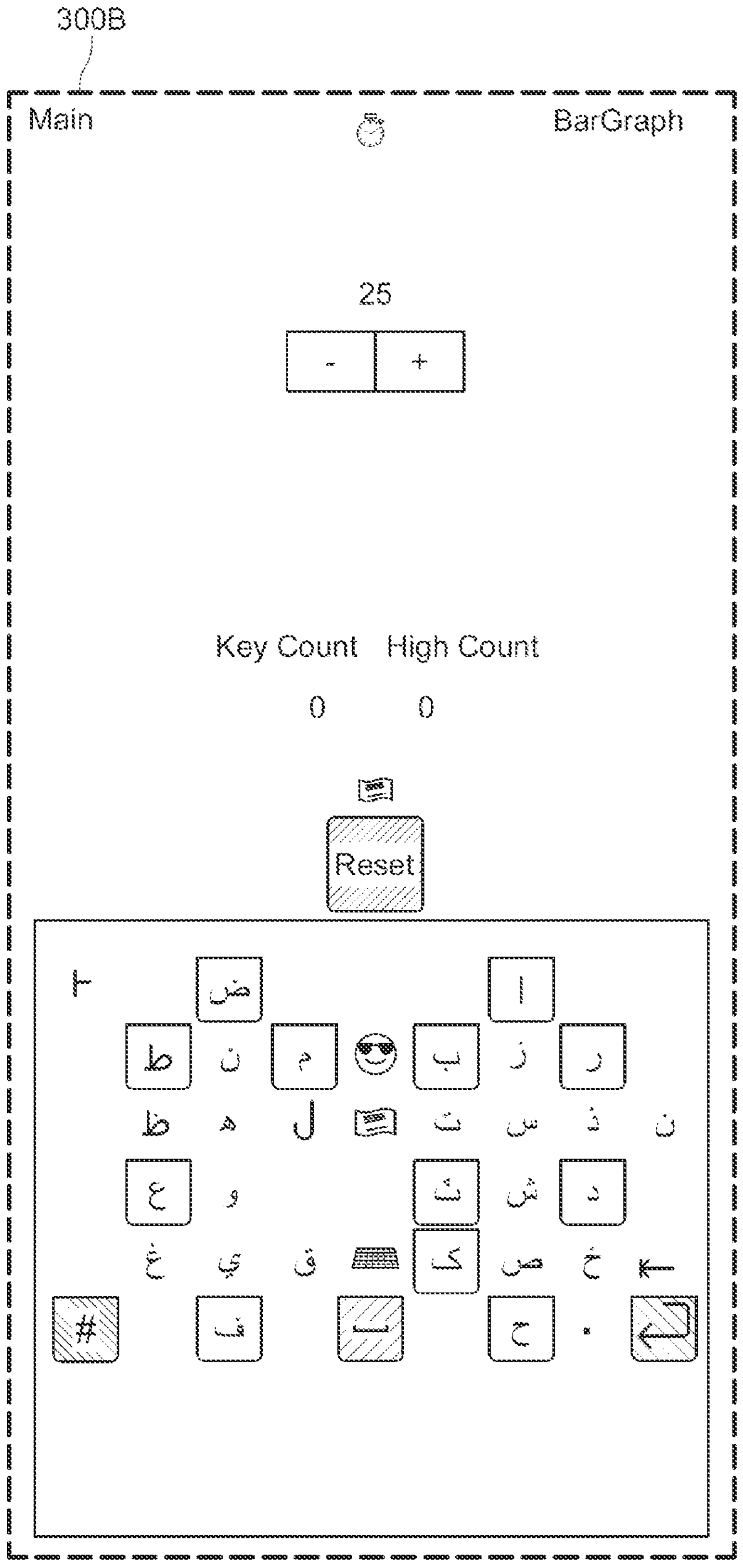
FIG. 3B depicts a diagram illustrating a random positional state of Arabic language character labeled-buttons in left-side and right-side clusters embodiment in accordance with embodiments of the present disclosure.

FIG. 3B depicts a diagram 300B illustrating a random positional state of Arabic language character labeled-buttons in left-side and right-side clusters embodiment in accordance with embodiments of the present disclosure.

Figure 4A:
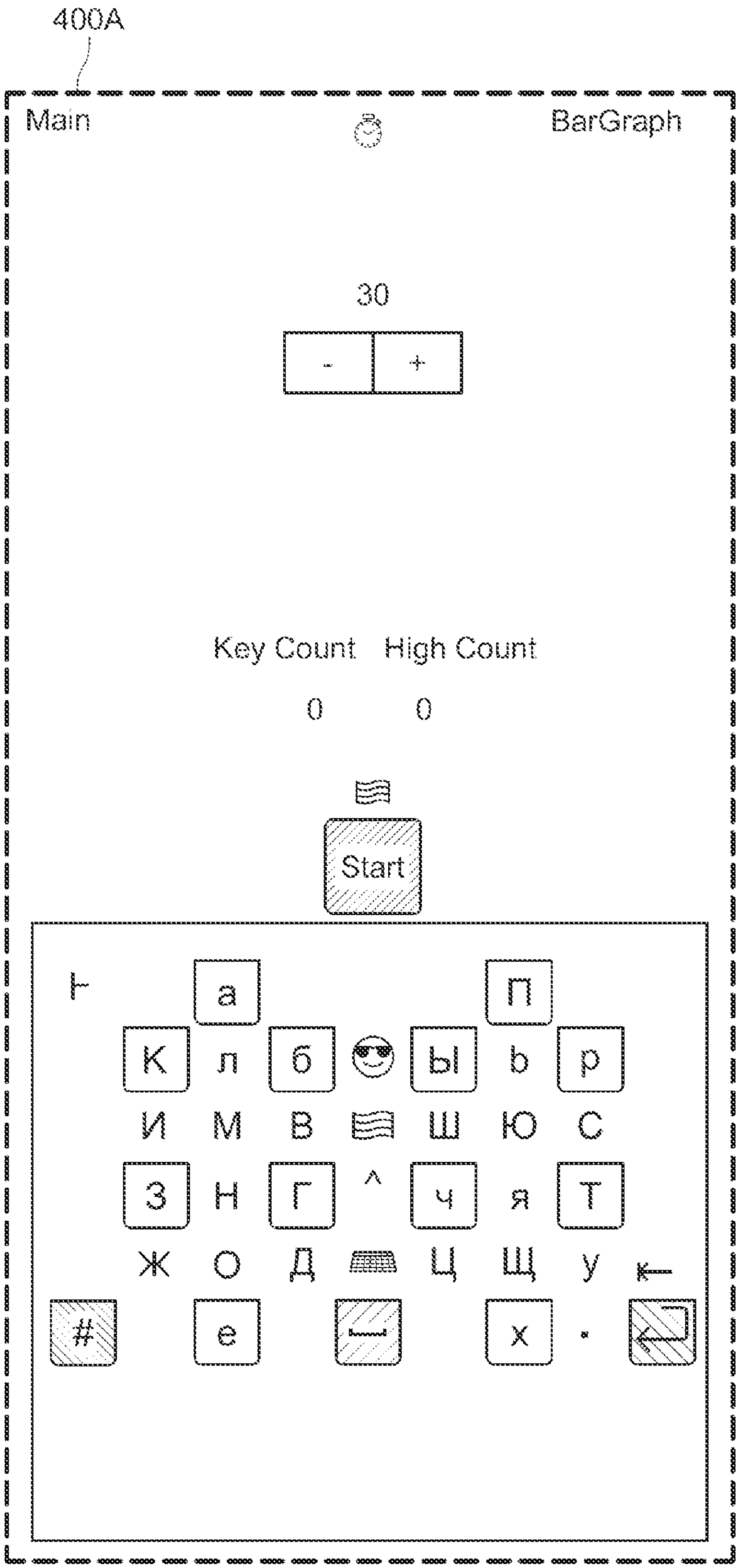
FIG. 4A depicts a diagram illustrating initial positional state of Russian language character labeled-buttons in left-side and right-side clusters in accordance with embodiments of the present disclosure.

FIG. 4A depicts a diagram 400A illustrating initial positional state of Russian language character labeled-buttons in left-side and right-side clusters in accordance with embodiments of the present disclosure.

Figure 4B:
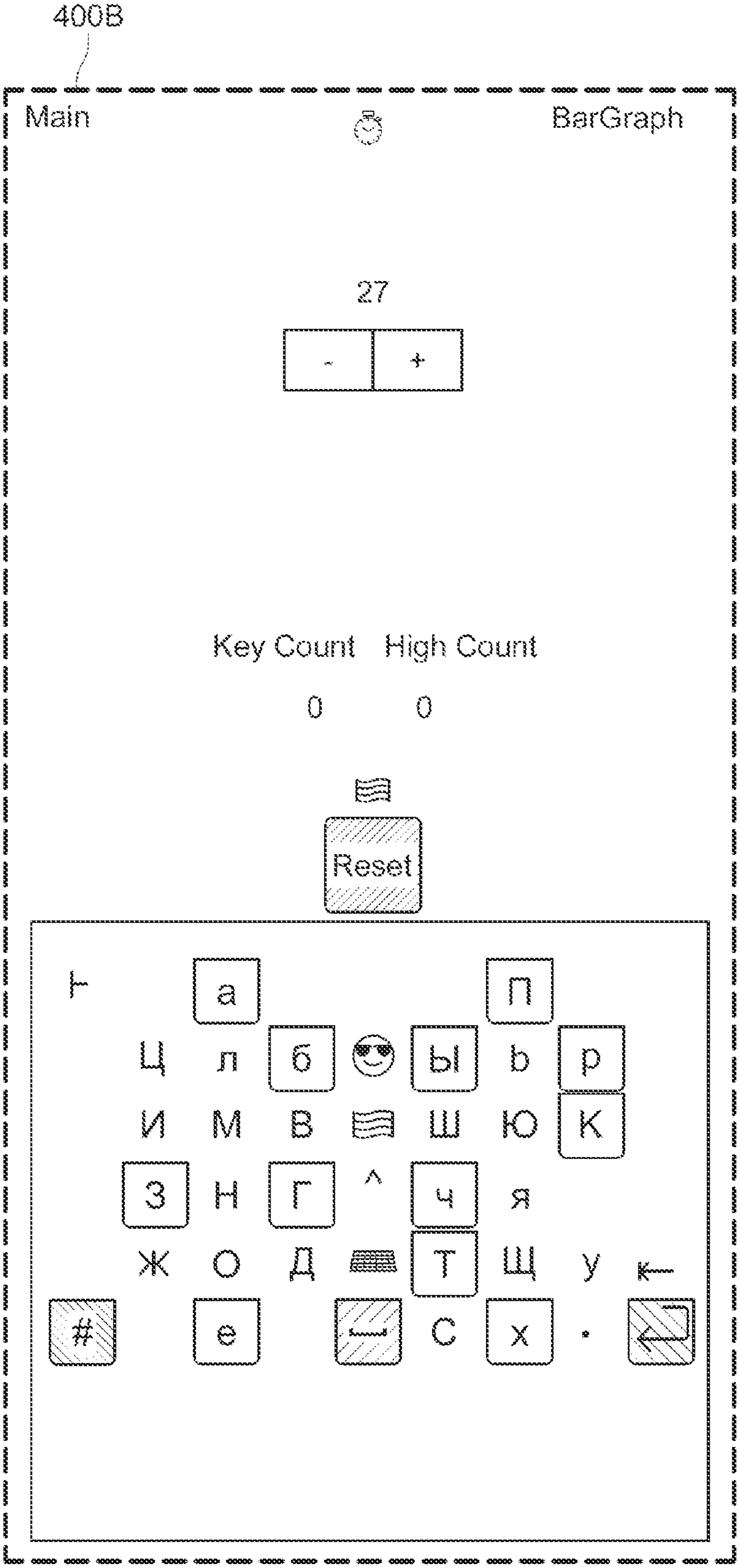
FIG. 4B depicts a diagram illustrating a random positional state of Russian language character labeled-buttons in left-side and right-side clusters in accordance with embodiments of the present disclosure.

FIG. 4B depicts a diagram 400B illustrating a random positional state of Russian language character labeled-buttons in left-side and right-side clusters in accordance with embodiments of the present disclosure.

Figure 5A:
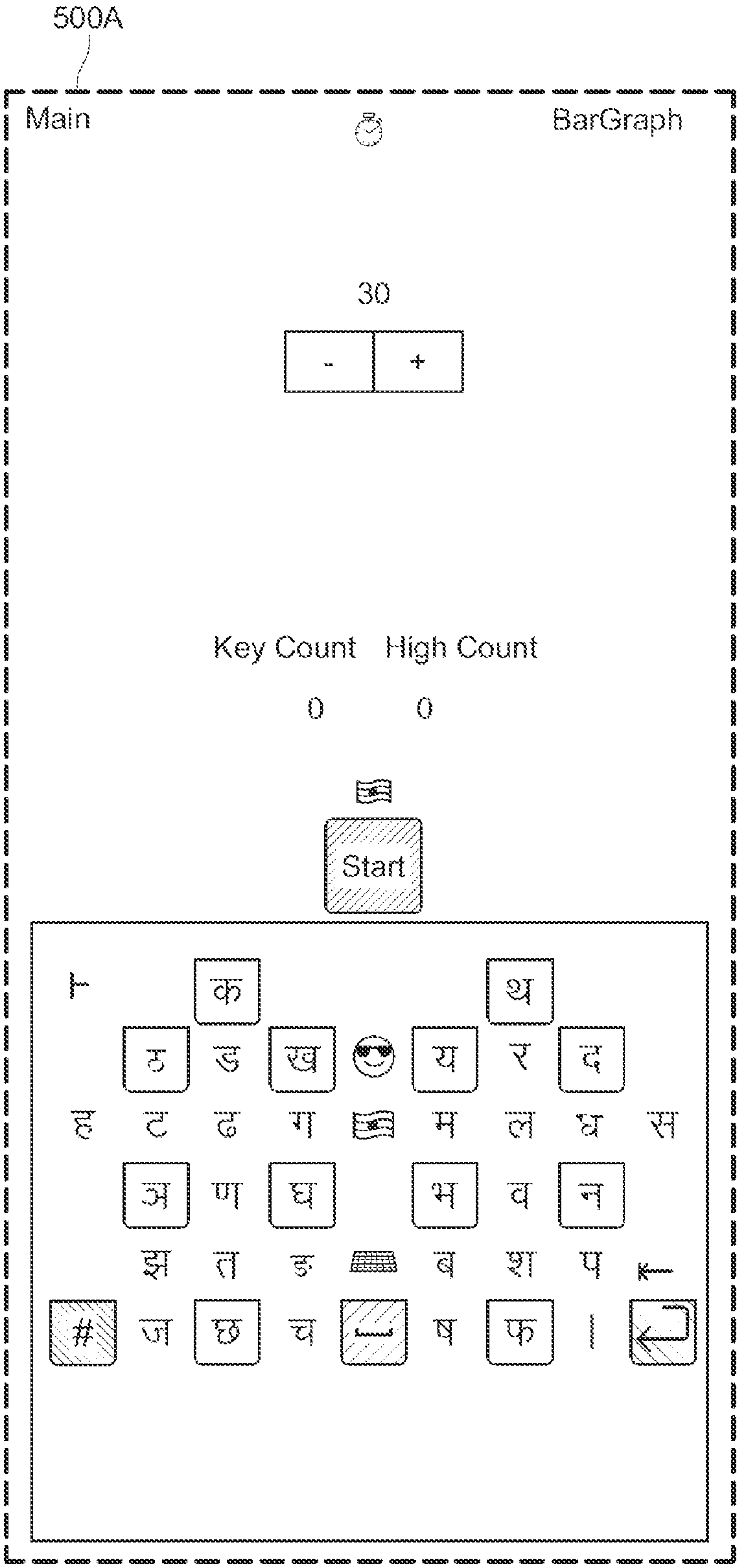
FIG. 5A depicts a diagram illustrating an initial positional state of Hindi language character labeled-buttons in left-side and right-side clusters in accordance with embodiments of the present disclosure.

FIG. 5A depicts a diagram 500A illustrating an initial positional state of Hindi language character labeled-buttons in left-side and right-side clusters in accordance with embodiments of the present disclosure.

Figure 5B:
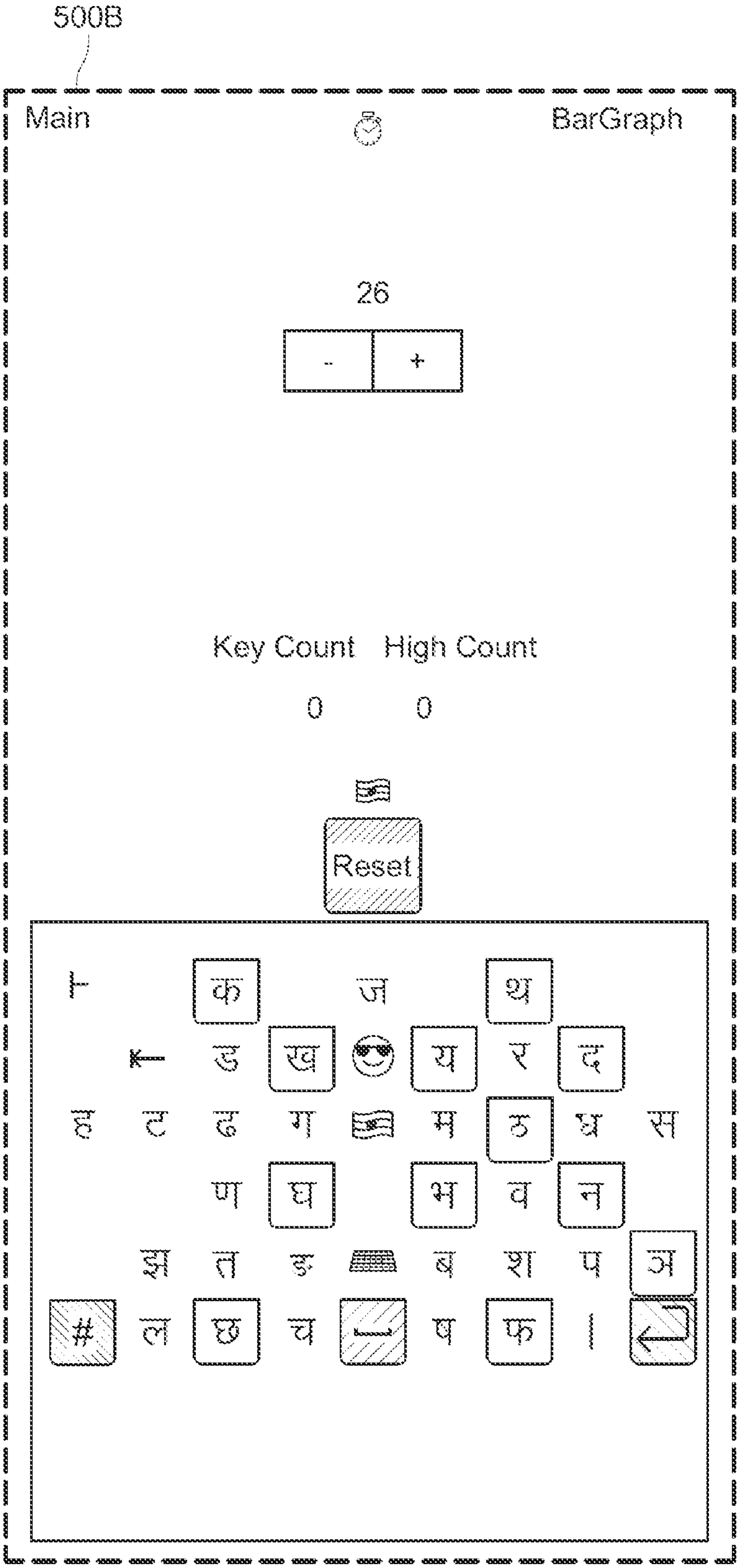
FIG. 5B depicts a diagram illustrating a random positional state of Hindi language character labeled-buttons in left-side and right-side clusters in accordance with embodiments of the present disclosure.

FIG. 5B depicts a diagram 500B illustrating a random positional state of Hindi language character labeled-buttons in left-side and right-side clusters in accordance with embodiments of the present disclosure.

Figure 6:
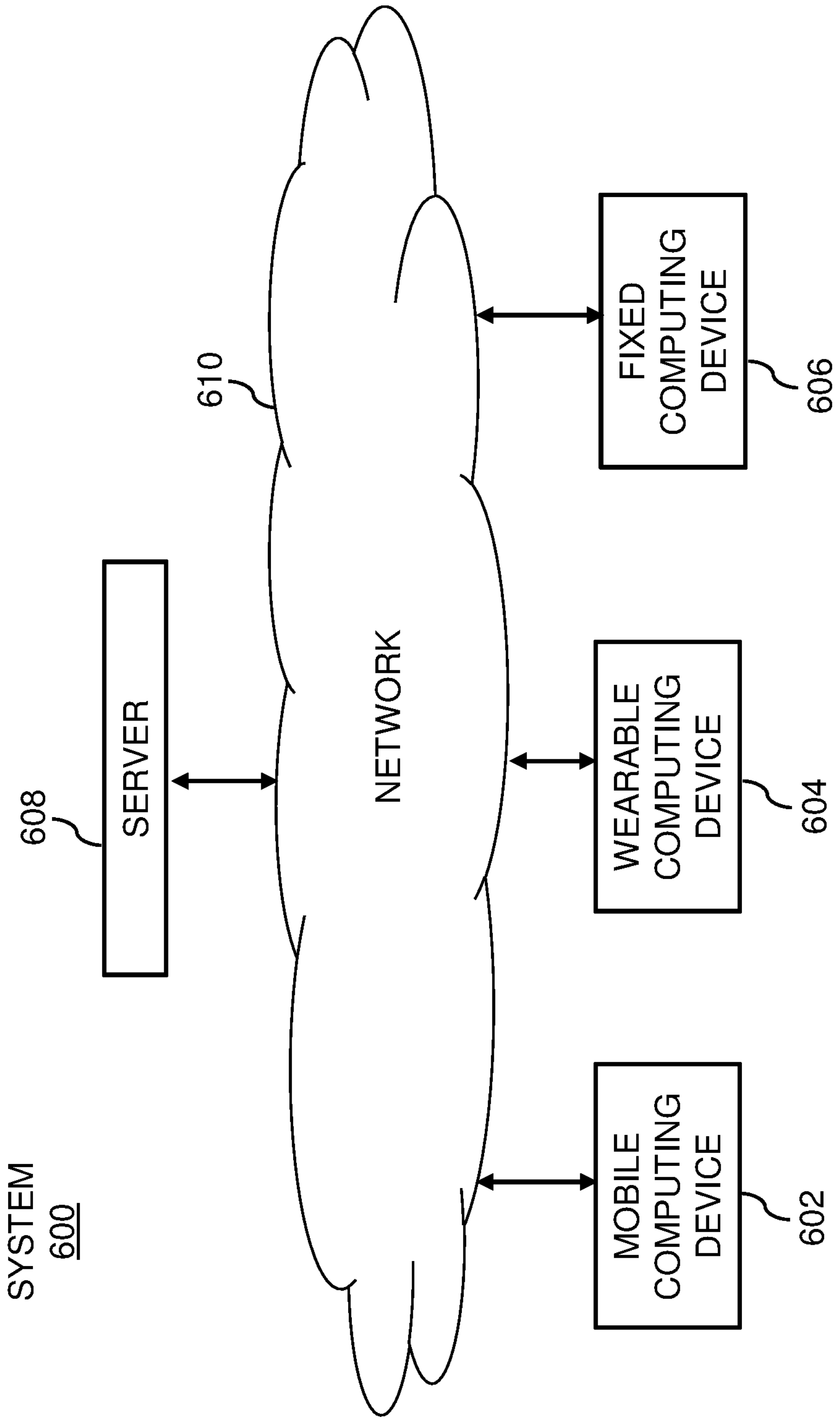
FIG. 6 depicts a block diagram illustrating a system including a server, a mobile computing device, a wearable computing device, and a fixed computing device for providing a character matrix game in accordance with embodiments of the present disclosure.

FIG. 6 depicts a block diagram illustrating a system 600 including a mobile computing device 602, a wearable computing device 604, a fixed computing device 606, and a server 608 for providing a character matrix game in accordance with embodiments of the present disclosure. The system 600 includes a mobile computing device 602, a wearable computing device 604, and a fixed computing device 606, a server 608 and a network 610. The mobile computing device 602, the wearable computing device 604, and/or the fixed computing device 606 may execute a dedicated application for providing one or more of the previously disclosed character matrix games. In other embodiments, the server 608 may be configured to execute one or more of the character matrix games and provide to a thin client application (e.g., a web browser, or the like) on the mobile computing device 602, the wearable computing device 604, and/or the fixed computing device 606. The network 606 may be any type or combination of wired, wireless, and/or optical networks. The network 606 may include one or more WANs, LANs, and PANs. The network 606 may also include the Internet.

Figure 7:
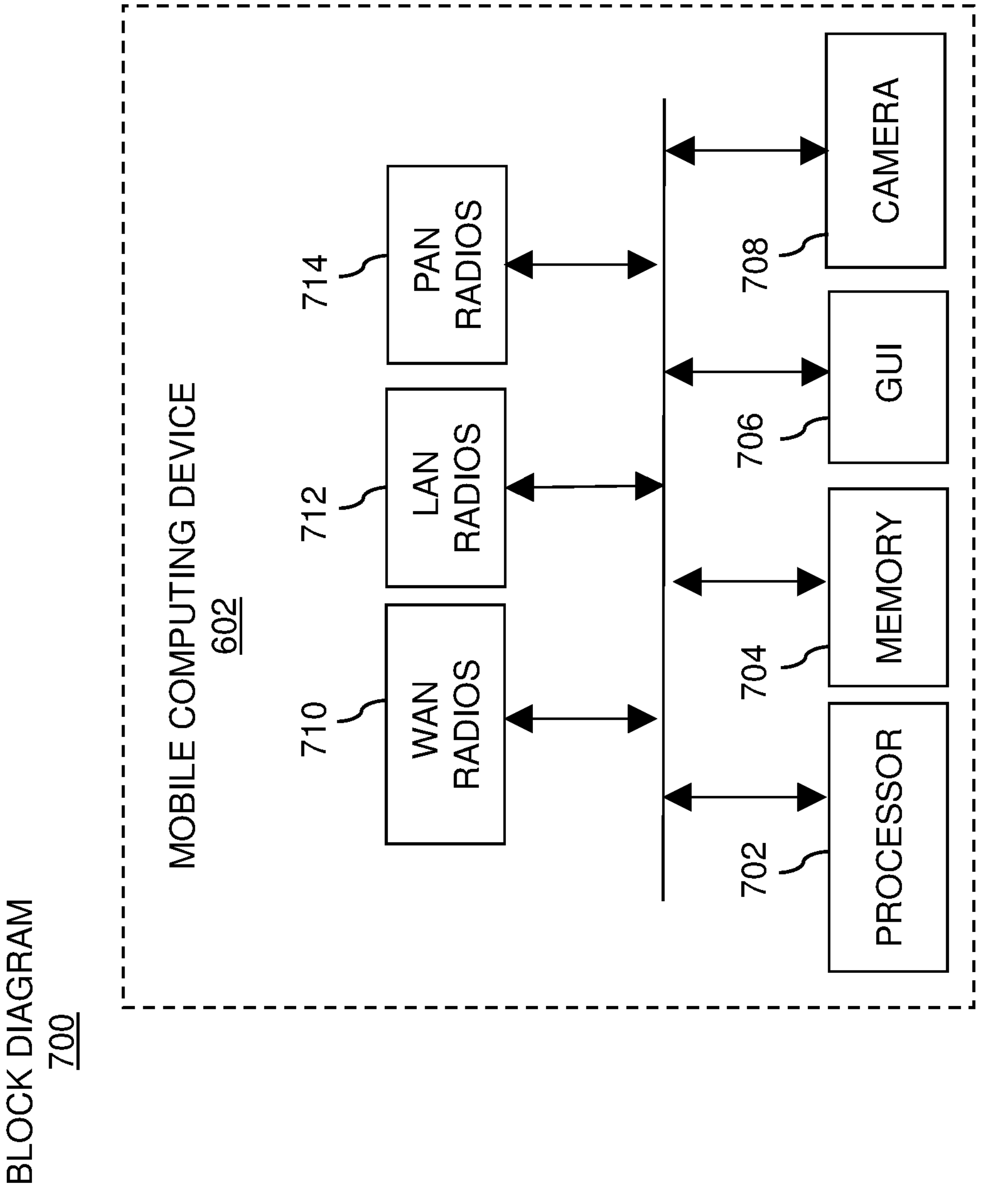
FIG. 7 depicts a block diagram illustrating the mobile computing device of the system of FIG. 6 in accordance with embodiments of the present disclosure.

FIG. 7 depicts a block diagram 700 illustrating the mobile computing device 602 of FIG. 6 in accordance with embodiments of the present disclosure. The mobile computing device 602 may be a smart phone (e.g., cell phone), a tablet, a laptop, a smart watch, or the like. The mobile device includes a processor 702, a memory 704, a graphical user interface (GUI) 706, a camera 708, LAN radios 710, and PAN radios 712.

In some embodiments, the memory 704 or a portion of the memory 704 may be integrated with the processor 702. The memory 704 may include a combination of volatile memory (e.g., random access memory) and non-volatile memory (e.g., flash memory). The memory 704 includes program instructions (i.e., one or more mobile apps) when executed by the processor 702 allow the mobile computing device 602 to provide the previously disclosed character matrix games to the GUI 706. In certain embodiments, the processor 702 may be a mobile processor such as the Qualcomm® Snapdragon® mobile processor. For example, the processor 702 may be the Snapdragon® 855 mobile processor. The GUI 706 may be a touchpad display.

The WAN radios 710 may include 2G, 3G, 4G, and/or 5G technologies. The mobile computing device 602 may also include a GPS receiver (not shown in FIG. 7). The LAN radios 712 may include Wi-Fi technologies such as 802.11a, 802.11b/g/n, and/or 802.11ac circuitry. The PAN radios 714 may include Bluetooth® and/or BLE technologies for communication.

Figure 8:
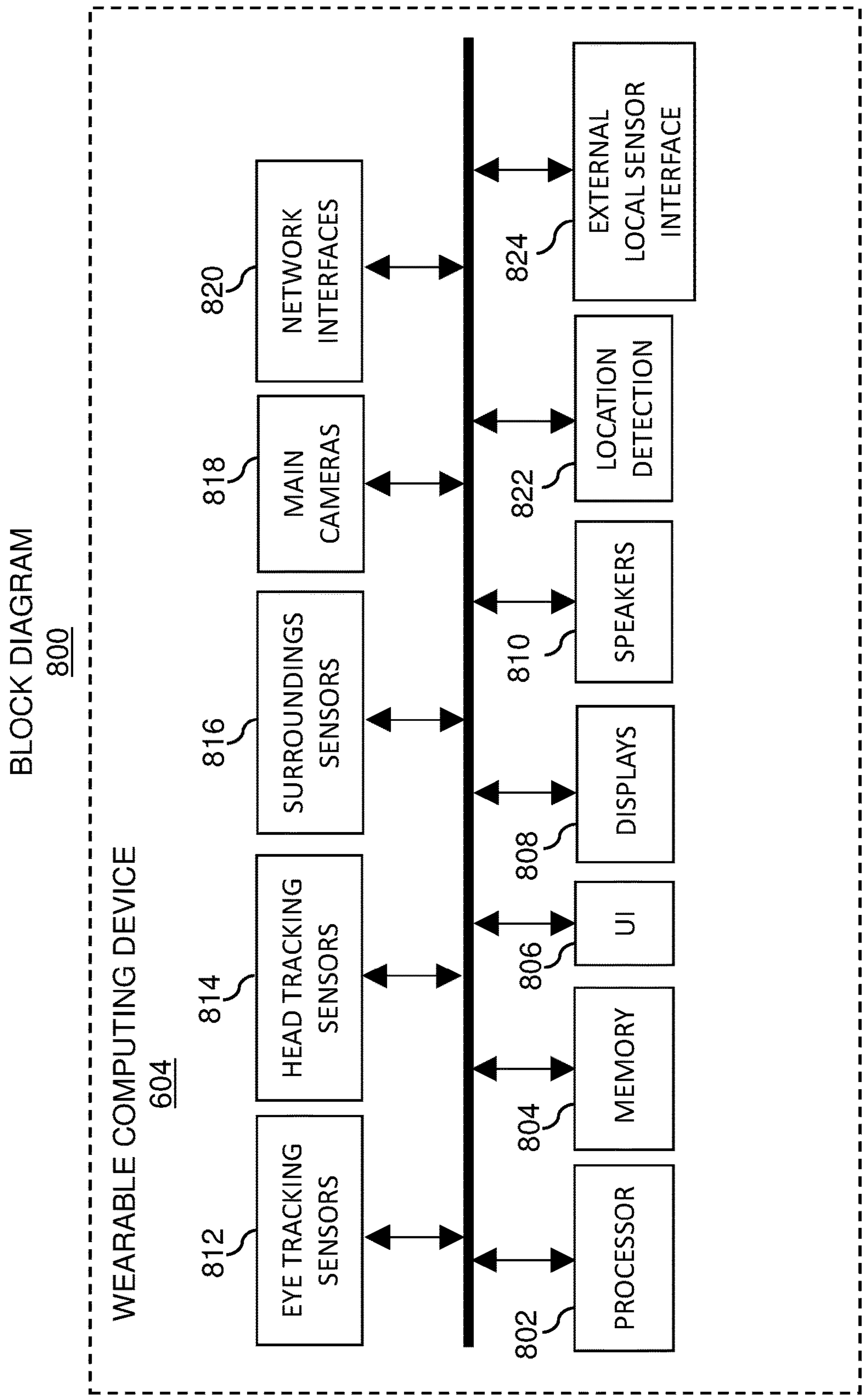
FIG. 8 depicts a block diagram illustrating the wearable computing device of the system of FIG. 6 in accordance with embodiments of the present disclosure.

FIG. 8 depicts a block diagram 800 illustrating the wearable computing device 604 of FIG. 6 in accordance with embodiments of the present disclosure. The wearable computing device 604 includes a processor 802, a memory 804, a user interface (UI) 806, displays 808, speakers 810, eye tracking sensors 812, head tracking sensors 814, surroundings sensors 816, main cameras 818, and network interfaces 820.

The processor 802 may be the Qualcomm Snapdragon 835 System on Chip (SoC) or the like. In some embodiments the memory 804 or a portion of the memory 804 may be integrated with the processor 802. The memory 804 may include a combination of volatile memory (e.g., random access memory) and non-volatile memory (e.g., flash memory). The UI 806 may include a touchpad display.

The displays 808 may include left and right displays for each eye of an individual wearing the wearable computing device 604. In some embodiments, the displays 808 may have a resolution of 1080×1200 per eye or greater. In further embodiments, the displays 808 may have a resolution of 1440×1600 per eye or greater. The displays 808 may be used to view the character matrix games previously disclosed.

The speakers 810 may be positioned within the wearable computing device 604. In other embodiments, the speakers 810 may be provided as earbuds or headphones. Connections to the speakers 810 may be wired or wireless (e.g., Bluetooth®).

The eye tracking sensors 812 may include cameras co-positioned with the displays 808. The head tracking sensors 814 may include a three-axis gyroscope sensor, an accelerometer sensor, a proximity sensor, or the like. The surroundings sensors 816 may include cameras positioned at a plurality of angles to view an outward circumference of the wearable computing device 810. The main cameras 818 may include high resolution cameras configured to provide main left eye and right eye views to the user.

The network interfaces 820 may include a plurality of wireless radios. The wireless radios may include wide area network (WAN) radios, local area network (LAN) radios, and personal area network (PAN) radios. The WAN radios may include 2G, 3G, 4G, and/or 5G circuitry. The LAN radios may include Wi-Fi technologies such as 802.11a, 802.11b/g/n, and/or 802.11ac circuitry. The PAN radios may include Bluetooth® circuitry and/or Bluetooth Low Energy (BLE®) circuitry.

The wearable computing device 604 also includes location detection 822, and an external local sensor interface 824. The location detection 822 may include a GPS receiver for identifying and/or verifying the present location of the wearable computing device 604.

The external local sensor interface 824 is configured to communicate with external sensors to the wearable computing device 604. For example, a VR or AR body suit, health monitoring, sensors, and or the like. Additionally, the PAN radios may be used for this purpose. The wearable computing device 604 may also include a rechargeable battery and recharging circuitry (not shown in FIG. 8). The recharging circuitry may be wired or wireless.

The wearable computing device may contain program instructions for algorithms and features associated with VR wearable devices and AR wearable devices. The VR wearable devices may include Oculus® Quest VR headsets, Oculus® Quest 2 VR headsets, Oculus® Go headsets, Pico Neo® 1 VR headsets, Pico Neo® 2 VR headsets, Pico Neo® 3 VR headsets, Pico Goblin® 1 VR headsets, Pico Goblin® 2 VR headsets, HTC VIVE® Focus VR headsets, HTC VIVE® Focus Plus VR headsets, HTC VIVE® Focus 3 VR headsets, and/or the like. The AR wearable devices may include Apple® Vision Pro headsets, Hololens® 1 AR headsets, Hololens® 2 AR headsets, Magic Leap® 1 AR headsets, and/or the like.

Figure 9:
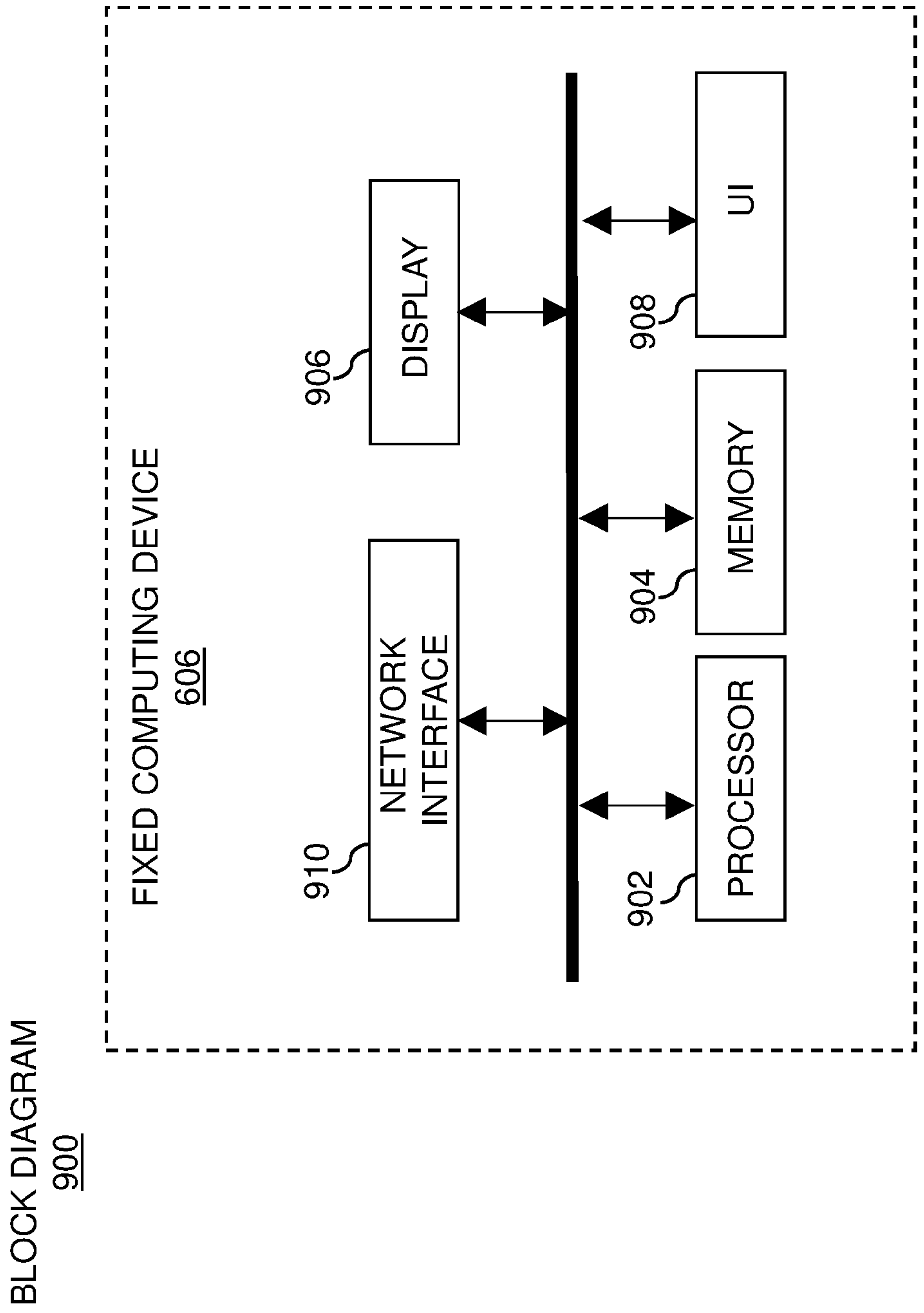
FIG. 9 depicts a block diagram illustrating the fixed computing device of the system of FIG. 6 in accordance with embodiments of the present disclosure.

FIG. 9 depicts a block diagram 900 illustrating the fixed computing device 606 of FIG. 6 in accordance with embodiments of the present disclosure. The fixed computing device 606 may be configured to host a specific application (e.g., one of more of the previously disclosed character matrix games), a browser application, and/or other third party applications. The fixed computing device 606 includes at least one processor 902, a memory 904, a display 906, a user interface (UI) 908, and a network interface 612.

The fixed computing device 606 may include an operating system (OS) such as a Windows® OS, a Macintosh® OS, a Linux® OS, or the like. The memory 904 may include a combination of volatile memory (e.g., random access memory) and non-volatile memory (e.g., solid state drive and/or hard drives). The display 606 may be an external display (e.g., computer monitor) or internal display (e.g., laptop). The UI 908 may include a keyboard, and a pointing device (e.g., mouse). The network interface 910 may be a wired Ethernet interface or a Wi-Fi interface.

Figure 10:
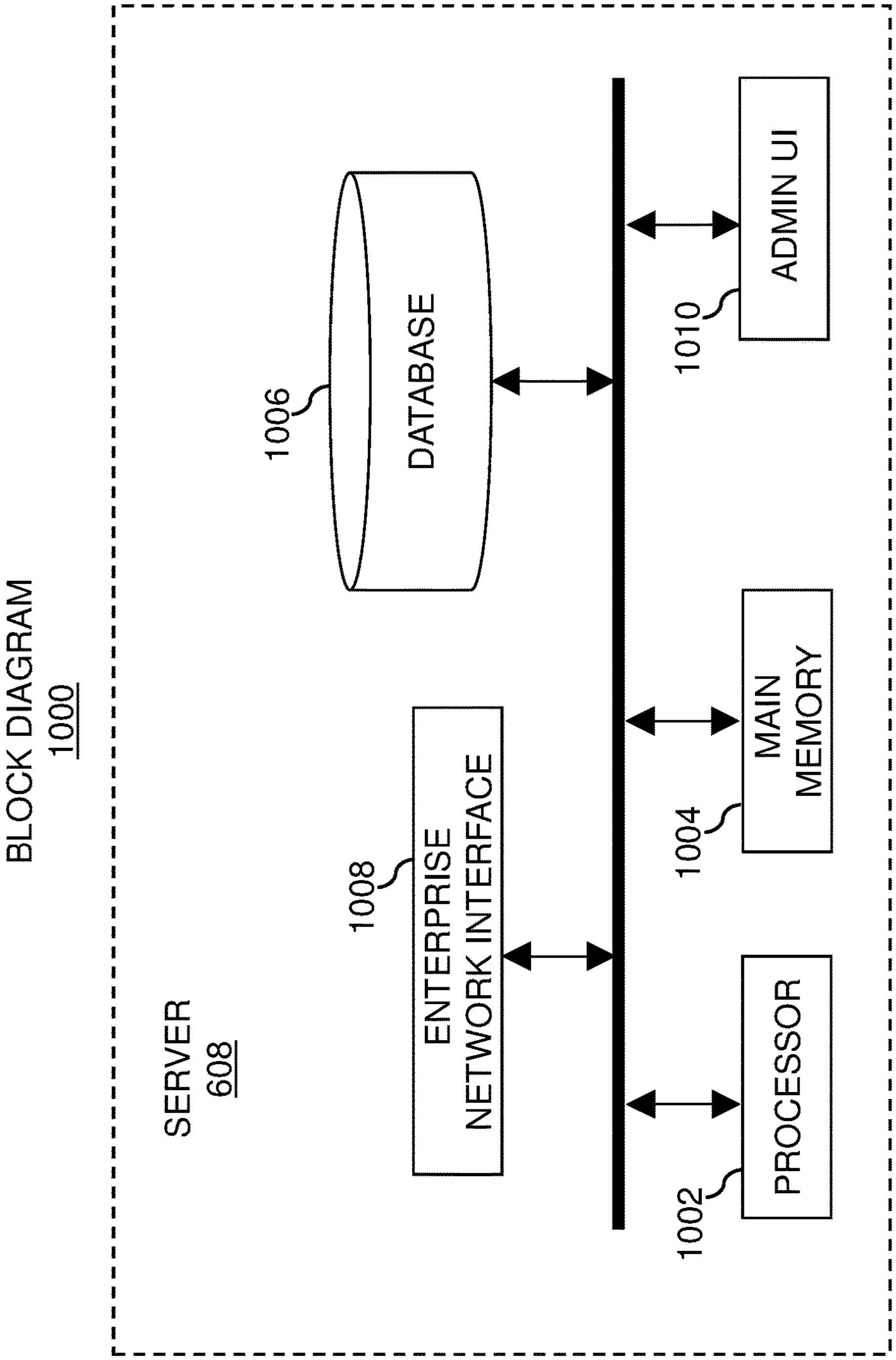
FIG. 10 depicts a block diagram illustrating the server of the system of FIG. 6 in accordance with embodiments of the present disclosure.

FIG. 10 depicts a block 1000 diagram illustrating the server 608 of FIG. 6 in accordance with embodiments of the present disclosure. The server 608 is a hardware server and may include a processor 1002, a main memory 1004, a database 1008, a datacenter network interface 1008, and an administration user interface (UI) 1010. The server 608 may be configured to host a virtual server. For example, the virtual server may be an Ubuntu® server or the like. The server 608 may also be configured to host a virtual container. For example, the virtual container may be the Docker® virtual container or the like. In some embodiments, the virtual server and/or virtual container may be distributed over a plurality of hardware servers using hypervisor technology. The server 608 may be implemented in the Microsoft Azure®, the Amazon Web Services® (AWS), or the like cloud computing data center environments. In other embodiments, the server 608 may be hosted locally with a user or at a business location.

The processor 1002 may be a multi-core server class processor suitable for hardware virtualization. The processor 1002 may support at least a 64-bit architecture and a single instruction multiple data (SIMD) instruction set. The main memory 1004 may include a combination of volatile memory (e.g., random access memory) and non-volatile memory (e.g., flash memory). The database 1006 may include one or more hard drives. The database 1006 may be configured to host rule sets and actions (including profiles) for users playing the previously disclosed character matrix games. In some embodiments, the database 1006 may be an open source database such as the MongoDB® database, the PostgreSQL® database, or the like.

The enterprise network interface 1008 may provide one or more high-speed communication ports to the data center switches, routers, and/or network storage appliances. The enterprise network interface 1008 may include high-speed optical Ethernet, InfiniB and (IB), Internet Small Computer System Interface iSCSI, and/or Fibre Channel interfaces. The administration UI 1010 may support local and/or remote configuration of the server 608 by a data center administrator and/or an individual configuring character matrix games.

Figure 11:
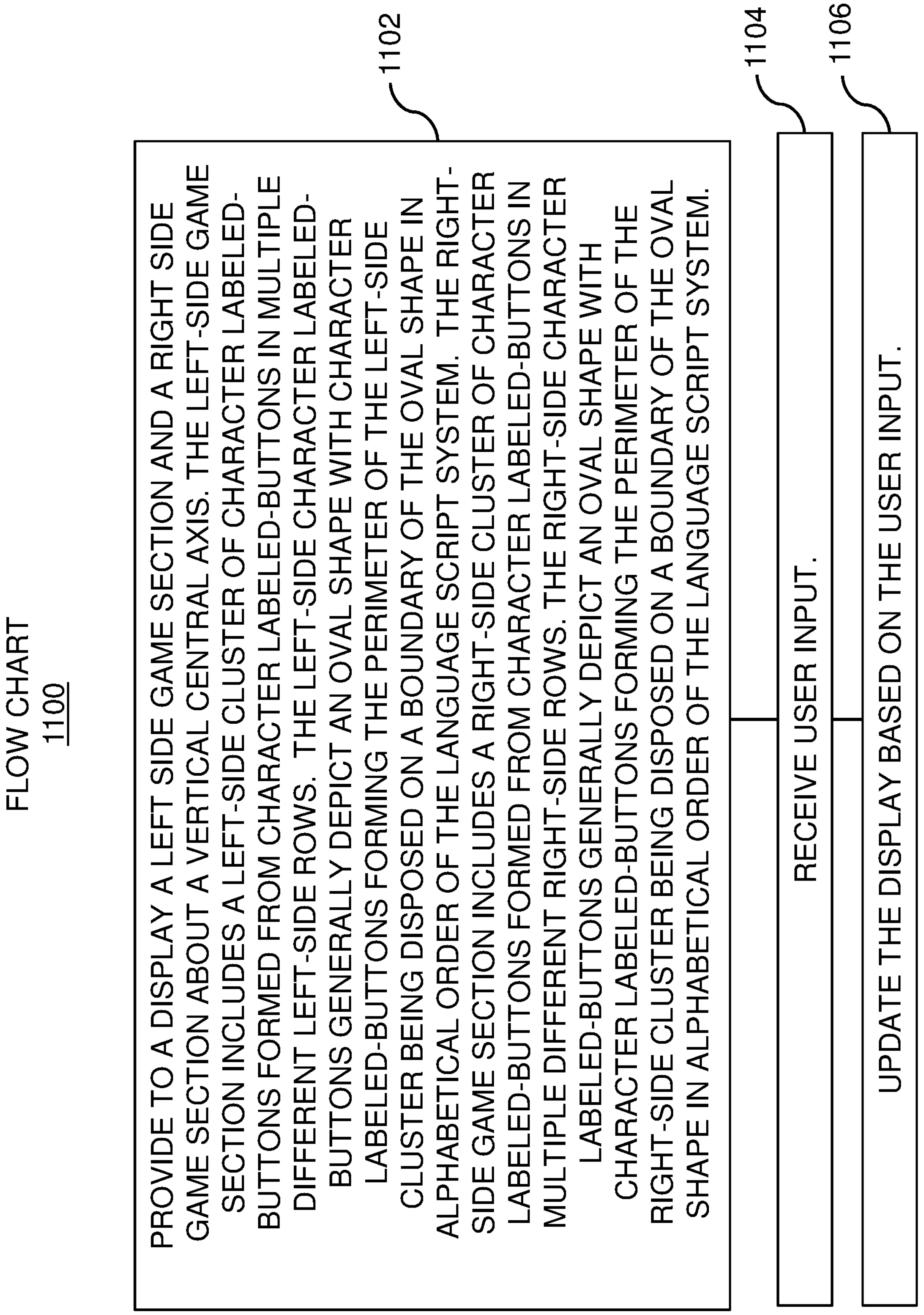
FIG. 11 depicts a flowchart illustrating a method for providing an alphabet matrix game to a GUI in accordance with embodiments of the present disclosure.

FIG. 11 depicts a flowchart 1100 illustrating a programmatic method including broader embodiments for providing a character matrix game in accordance with embodiments of the present disclosure.

In step 1102, the programmatic method includes providing to a display a left side game section and a right side game section about a vertical central axis. The left-side game section includes a left-side cluster of character labeled-buttons formed from character labeled-buttons in multiple different left-side rows. The left-side character labeled-buttons generally depict an oval shape with character labeled-buttons forming the perimeter of the left-side cluster being disposed on a boundary of the oval shape in alphabetical order of the language script system. The right-side game section includes a right-side cluster of character labeled-buttons formed from character labeled-buttons in multiple different right-side rows. The right-side character labeled-buttons generally depict an oval shape with character labeled-buttons forming the perimeter of the right-side cluster being disposed on a boundary of the oval shape in alphabetical order of the language script system.

In step 1104, the programmatic method further includes receiving user input. The user input may be received via physical/anatomical, brain-waves and/or optical-vision gestures.

In step 1106, the programmatic method further includes updating the display based on the user input.

In summary; methods, devices, and systems are disclosed to provide a character matrix game that is configured as an alphabet and/or glyph matrix of character labeled-buttons that uses a method to place character labeled-buttons into an initial positional formation/layout of a defined language script, with a method to create a randomly positional state of the character labeled-buttons within the matrix being displayed on a touch screen or virtual screen device. The character matrix game has a left-side section and a right-side section of an electronic device's display screen. The left-side game section comprises a left-side cluster of letters formed from letters in multiple different left-side rows, including a left-side top row and a left-side bottom row that each has only a single letter. Letters forming a perimeter of the left-side cluster are arranged around the perimeter in alphabetical order according to said alphabet. Similarly, the right-side game section comprises a right-side cluster of letters formed from letters in multiple different right-side rows, including a right-side top row and a right-side bottom row that each has only a single letter. Letters forming a perimeter of the right-side cluster are arranged around the perimeter in alphabetical order according to said alphabet. The objective of the character matrix game is to move the letters and/or glyphs of a given language script from the random positional state back to the initial positional state.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product (e.g., the method of FIG. 4) embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C #, Objective-C, Go, Scala, Swift, Kotlin, OCaml, or the like. The program code may execute entirely on the user's computer, partly on the user's computer, as a stand-alone software package, partly on the user's computer, and partly on a remote computer or entirely on the remote computer or server.

Aspects of the present invention are described in the instant specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a user" can include a plurality of such users, and so forth. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A programmatic method for providing a game using character labeled buttons of a language script system, the programmatic method comprising:

providing to a display:

a central axis extending in a vertical direction;

a left-side game section on a left of the central axis comprising a left-side cluster of character labeled-buttons formed from character labeled-buttons in multiple different left-side rows, including a left-side top row proximate to a top of the game and a left-side bottom row proximate to a bottom of the game that each has only a single labeled-character button to elongate the left-side cluster of character labeled-buttons in a vertical direction parallel to the central axis, wherein the left side character labeled-buttons generally depict a perimeter of the left-side cluster as approximating an oval shape with character labeled-buttons forming the perimeter of the left-side cluster being disposed on a boundary of the oval shape in alphabetical order of the language script system; and a right-side game section on the right of the central axis comprising a right-side cluster of character labeled-buttons formed from character labeled-buttons in multiple different right-side rows, including a right-side top row proximate to the top of the game and a right-side bottom row proximate to the bottom of the game that each has only a single character labeled-button to elongate the right-side cluster of character labeled-buttons in a vertical direction parallel to the central axis, wherein the right-side character labeled-buttons generally depict a perimeter of the right-side cluster as approximating an oval shape with character labeled-buttons forming the perimeter of the right-side cluster being disposed on a boundary of the oval shape in alphabetical order of the language script system, wherein the left-side game section and the right-side game section are spaced apart;

receiving user input including a request to start a current game session; and updating the display based on the user input including repositioning at least a portion of the character labeled-buttons of the left-side cluster of character labeled-buttons and right-side cluster of character labeled-buttons from an initial positional state to a random positional state, wherein an objective of the game is to move the character labeled-buttons from the random positional state back to the initial positional state.

2. The programmatic method of claim 1, wherein:

the left-side cluster comprises left-side inner alphabetically-ordered character labeled-buttons that are character labeled-buttons in an inner part of the left-side cluster and that are arranged in a line in alphabetical order according to an alphabet; and the right-side cluster comprises right-side inner alphabetically-ordered character labeled-buttons that are character labeled-buttons in an inner part of the right-side cluster and that are arranged in a line in alphabetical order according to said alphabet.

3. The programmatic method of claim 2, wherein:

the character labeled-buttons forming the perimeter of the left-side cluster are each ordered in the alphabet before any of the left-side inner alphabetically-ordered character buttons;

the left-side inner alphabetically-ordered character labeled-buttons are each ordered in the alphabet before any of the character labeled-buttons forming the perimeter of the right-side cluster; and the character labeled-buttons forming the perimeter of the right-side cluster are each ordered in the alphabet before any of the right-side inner alphabetically-ordered character labeled-buttons.

4. The programmatic method of claim 2, wherein:

the character labeled-buttons forming the perimeter of the right-side cluster are each ordered in the alphabet before any of the right-side inner alphabetically-ordered character labeled-buttons;

the right-side inner alphabetically-ordered character labeled-buttons are each ordered in the alphabet before any of the character labeled-buttons forming the perimeter of the left-side cluster; and the character labeled-buttons forming the perimeter of the left-side cluster are each ordered in the alphabet before any of the left-side inner alphabetically-ordered character labeled-buttons.

5. The programmatic method of claim 1, wherein:

the left-side rows further comprise:

a widest left-side row that is between the left-side top row and the left-side bottom row, that has two or more character labeled-buttons, and that is the widest among the left-side rows in terms of a distance spanned by character labeled-buttons in the left-side row or in terms of inter-character spacing;

an upper intermediate left-side row that is between the widest left-side row and the left-side top row, that has two or more character labeled-buttons, and that is narrower than the widest left-side row in terms of a distance spanned by character labeled-buttons in the left-side row or in terms of inter-character spacing; and a lower intermediate left-side row that is between the widest left-side row and the left-side bottom row, that has two or more character labeled-buttons, and that is narrower than the widest left-side row in terms of a distance spanned by character labeled-buttons in the left-side row or in terms of inter-character spacing; and the right-side rows further comprise:

a widest right-side row that is between the right-side top row and the right-side bottom row, that has two or more letter labeled-buttons, and that is the widest among the right-side rows in terms of a distance spanned by character labeled-buttons in the right-side row or in terms of inter-character spacing;

an upper intermediate buttons-side row that is between the widest right-side row and the right-side top row, that has two or more character labeled-buttons, and that is narrower than the widest right-side row in terms of a distance spanned by character labeled-buttons in the right-side row or in terms of inter-character spacing; and a lower intermediate right-side row that is between the widest right-side row and the right-side bottom row, that has two or more character labeled-buttons, and that is narrower than the widest right-side row in terms of a distance spanned by character buttons in the right-side row or in terms of inter-character spacing.

6. The programmatic method of claim 5, wherein:

the left-side rows further comprise a further lower intermediate left-side row that is between the lower intermediate left-side row and the left-side bottom row, that has two or more character labeled-buttons, and that is narrower than the lower intermediate left-side row in terms of a distance spanned by character labeled-buttons in the left-side row or in terms of inter-character spacing, and the right-side rows further comprise a further lower intermediate right-side row that is between the lower intermediate right-side row and the right-side bottom row, that has two or more character labeled-buttons, and that is narrower than the lower intermediate right-side row in terms of a distance spanned by character labeled-buttons in the right-side row or in terms of inter-character spacing.

7. The programmatic method of claim 1, wherein:

the single character labeled-button in each of the left-side top row and the left-side bottom row is centered on a left-side axis extending between the left-side top row and the left-side bottom row, and wherein the single labeled-character button in each of the right-side top row and the right-side bottom row is centered on a right-side axis extending between the right-side top row and the right-side bottom row;

each left-side intermediate row between the left-side top row and the left-side bottom row comprises at least an outermost left-side character labeled-button and an outermost right-side character labeled-button, wherein the outermost labeled-left-side character button is offset the farthest left from the left-side axis among all character labeled-button in the left-side intermediate row, and wherein the outermost right-side character labeled-button is offset the farthest right from the left-side axis among all character labeled-buttons in the left-side intermediate row;

the perimeter of the left-side cluster is formed from the single character labeled-button in the left-side top row, the single character labeled-buttons in the left-side bottom row, and the outermost left-side character labeled-button and the outermost right-side character button in each left-side intermediate row;

each right-side intermediate row between the right-side top row and the right-side bottom row comprises at least an outermost left-side character labeled-button and an outermost right-side character labeled-button, wherein the outermost left-side character labeled-button is offset the farthest left from the right-side axis among all character labeled-buttons in the right-side intermediate row, and wherein the outermost right-side character labeled-buttons is offset the farthest right from the right-side axis among all character labeled-buttons in the right-side intermediate row; and the perimeter of the right-side cluster is formed from the single labeled-character button in the right-side top row, the single character button in the right-side bottom row, and the outermost left-side character labeled-button and the outermost right-side character labeled-button in each right-side intermediate row.

8. The programmatic method of claim 1, wherein:

the left-side rows comprise the left-side top row, the left-side bottom row, and four left-side intermediate rows between the left-side top row and the left-side bottom row;

at least three of the four left-side intermediate rows comprise three or more character labeled-buttons;

the right-side rows comprise the right-side top row, the right-side bottom row, and four right-side intermediate rows between the right-side top row and the right-side bottom row; and at least three of the four right-side intermediate rows comprise three or more character labeled-buttons.

9. The programmatic method of claim 1, wherein:

the single character labeled-buttons in the left-side top row, the left-side bottom row, the right-side top row, and the right-side bottom row have a common visual characteristic that visually distinguishes the single character labeled-buttons from character labeled-buttons in an inner part of the left-side cluster and from character labeled-buttons in an inner part of the right-side cluster; and at least some of the character labeled-buttons forming the perimeter of the left-side cluster also have the common visual characteristic, and wherein at least some of the character labeled-buttons forming the perimeter of the right-side cluster also have the common visual characteristic.

10. The programmatic method of claim 1, wherein:

the single character labeled-button in the left-side top row is an ‘a’ letter;

the left-side rows further comprise:

a second left-side row of character labeled-buttons that is below the left-side top row and that, from left to right, comprises a ‘j’ letter, a ‘k’ letter, and a ‘b’ letter;

a third left-side row of character labeled-buttons that is below the second left-side row and that, from left to right, comprises an ‘i’ letter, an ‘l’ letter, and a ‘c’ letter;

a fourth left-side row of character labeled-buttons that is below the third left-side row and that, from left to right, comprises an ‘h’ letter, an ‘m’ letter, and a ‘d’ letter; and a fifth left-side row of character labeled-buttons that is below the fourth left-side row, that is above the left-side bottom row, and that, from left to right, comprises a ‘g’ letter and an ‘e’ letter;

the single character labeled-button in the left-side bottom row is an ‘f’ letter;

the single character labeled-button in the right-side top row is an ‘n’ letter;

the right-side rows further comprise:

a second right-side row of character labeled-buttons that is below the right-side top row and that, from left to right, comprises a ‘w’ letter, an ‘x’ letter, and an ‘o’ letter;

a third right-side row of character labeled-buttons that is below the second right-side row and that, from left to right, comprises a ‘v’ letter, a ‘y’ letter, and a ‘p’ letter;

a fourth right-side row of character labeled-buttons that is below the third right-side row and that, from left to right, comprises a ‘u’ letter, a ‘z’ letter, and a ‘q’ letter; and a fifth right-side row of character labeled-buttons that is below the fourth right-side row, that is above the right-side bottom row, and that, from left to right, comprises a ‘t’ letter and an ‘r’ letter;

and the single character labeled-button in the right-side bottom row is an ‘s’ letter.

11. The programmatic method of claim 1, wherein at least a portion of the user input is received from a physical movement of the user, a plurality of brainwaves of the user, a plurality of eye movements of the user, or speech provided by the user.

12. The programmatic method of claim 1, wherein the request to start the current game session initiates a timer on the display.

13. The programmatic method of claim 12, wherein the timer is a count-down timer.

14. The programmatic method of claim 12 further comprising providing to the display a functional button for setting a starting time of the timer.

15. The programmatic method of claim 1 further comprising providing to the display a first count indicating a number count of user moved character labeled-buttons for the current game session.

16. The programmatic method of claim 1, wherein the language script system is an English language script system.

17. The programmatic method of claim 1, wherein the language script system is at least one of a Korean language script system, a Russian language script system, an Arabic language script system, and a Hindi language script system.

18. The programmatic method of claim 1, wherein the game is a character matrix game.

19. A computing device for providing a game using character labeled buttons of a language script system, the computing device comprising a memory; and at least one processor configured for:

providing to a display:

a central axis extending in a vertical direction;

a left-side game section on a left of the central axis comprising a left-side cluster of character labeled-buttons formed from character labeled-buttons in multiple different left-side rows, including a left-side top row proximate to a top of the game and a left-side bottom row proximate to a bottom of the game that each has only a single labeled-character button to elongate the left-side cluster of character labeled-buttons in a vertical direction parallel to the central axis, wherein the character labeled-buttons generally depict a perimeter of the left-side cluster as approximating an oval shape with character labeled-buttons forming the perimeter of the left-side cluster being disposed on a boundary of the oval shape in alphabetical order of the language script system; and a right-side game section on the right of the central axis comprising a right-side cluster of character labeled-buttons formed from character labeled-buttons in multiple different right-side rows, including a right-side top row proximate to the top of the game and a right-side bottom row proximate to the bottom of the game that each has only a single character labeled-button to elongate the right-side cluster of character labeled-buttons in a vertical direction parallel to the central axis, wherein the right-side character labeled-buttons generally depict a perimeter of the right-side cluster as approximating an oval shape with character labeled-buttons forming the perimeter of the right-side cluster being disposed on a boundary of the oval shape in alphabetical order of the language script system, wherein the left-side game section and the right-side game section are spaced apart;

receiving user input including a request to start a current game session; and updating the display based on the user input including repositioning at least a portion of the character labeled-buttons of the left-side cluster of character labeled-buttons and right-side cluster of character labeled-buttons from an initial positional state to a random positional state, wherein an objective of the game is to move the character labeled-buttons from the random positional state back to the initial positional state.

20. A non-transitory computer readable medium comprising a plurality of machine-readable instructions which when executed by one or more processors are adapted to perform a method for providing a game using character labeled buttons of a language script system, the method comprising:

providing to a display:

a central axis extending in a vertical direction;

a left-side game section on a left of the central axis comprising a left-side cluster of character labeled-buttons formed from character labeled-buttons in multiple different left-side rows, including a left-side top row proximate to a top of the game and a left-side bottom row proximate to a bottom of the game that each has only a single labeled-character button to elongate the left-side cluster of character labeled-buttons in a vertical direction parallel to the central axis, wherein the character labeled-buttons generally depict a perimeter of the left-side cluster as approximating an oval shape with character labeled-buttons forming the perimeter of the left-side cluster being disposed on a boundary of the oval shape in alphabetical order of the language script system; and a right-side game section on the right of the central axis comprising a right-side cluster of character labeled-buttons formed from character labeled-buttons in multiple different right-side rows, including a right-side top row proximate to the top of the game and a right-side bottom row proximate to the bottom of the game that each has only a single character labeled-button to elongate the right-side cluster of character labeled-buttons in a vertical direction parallel to the central axis, wherein the right-side character labeled-buttons generally depict a perimeter of the right-side cluster as approximating an oval shape with character labeled-buttons forming the perimeter of the right-side cluster being disposed on a boundary of the oval shape in alphabetical order of the language script system, wherein the left-side game section and the right-side game section are spaced apart;

receiving user input including a request to start a current game session; and updating the display based on the user input including repositioning at least a portion of the character labeled-buttons of the left-side cluster of character labeled-buttons and right-side cluster of character labeled-buttons from an initial positional state to a random positional state, wherein an objective of the game is to move the character labeled-buttons from the random positional state back to the initial positional state.

* * * * *